United States Patent
Decoux et al.

(10) Patent No.: US 9,987,866 B2
(45) Date of Patent: Jun. 5, 2018

(54) MARKING COMPRISING A CHIRAL LIQUID CRYSTAL POLYMER AND A LUMINESCENT SUBSTANCE

(71) Applicant: SICPA HOLDING SA, Prilly (CH)

(72) Inventors: Eric Decoux, Vevey (CH); Tristan Jauzein, Vevey (CH)

(73) Assignee: SICPA HOLDING SA, Prilly (CH)

( * ) Notice: Subject to any disclaimer, the term of this patent is extended or adjusted under 35 U.S.C. 154(b) by 0 days. days.

(21) Appl. No.: 15/300,654

(22) PCT Filed: Mar. 27, 2015

(86) PCT No.: PCT/EP2015/056679
§ 371 (c)(1),
(2) Date: Sep. 29, 2016

(87) PCT Pub. No.: WO2015/150246
PCT Pub. Date: Oct. 8, 2015

(65) Prior Publication Data
US 2017/0120649 A1    May 4, 2017

(30) Foreign Application Priority Data
Mar. 31, 2014    (WO) ............... PCT/EP2014/056468

(51) Int. Cl.
*B41M 3/14*    (2006.01)
*B41M 5/28*    (2006.01)
(Continued)

(52) U.S. Cl.
CPC .......... *B41M 3/144* (2013.01); *B41M 5/0023* (2013.01); *B41M 5/281* (2013.01);
(Continued)

(58) Field of Classification Search
CPC .......... B41M 3/14; B41M 3/144; B41M 5/00; B41M 5/0023; B41M 5/26; B41M 5/281;
(Continued)

(56) References Cited

U.S. PATENT DOCUMENTS 6,136,225 A    10/2000    Meyer et al.
6,565,770 B1    5/2003    Mayer et al.
(Continued)

FOREIGN PATENT DOCUMENTS

EP    0847432    6/2001
EP    2698404    2/2014
(Continued)

OTHER PUBLICATIONS

J. L. Fergason, Molecular Crystals, vol. 1, pp. 293-307 (1966).
(Continued)

*Primary Examiner* — Bruce H Hess
(74) *Attorney, Agent, or Firm* — Muncy, Geissler, Olds & Lowe, P.C.

(57) ABSTRACT

Described is a marking for a substrate. The marking comprises at least one luminescent substance (a) and at least one chiral liquid crystal polymer (CLCP) material (b) having a reflection wavelength range that overlaps at least a part of the luminescence wavelength range of (a), provided that at least a part of (b) is not located underneath (a).

24 Claims, 5 Drawing Sheets

(51) Int. Cl.

| | |
|---|---|
| *C09D 11/50* | (2014.01) |
| *B42D 25/364* | (2014.01) |
| *C09K 19/38* | (2006.01) |
| *G07D 7/2033* | (2016.01) |
| *G07D 7/202* | (2016.01) |
| *B42D 25/36* | (2014.01) |
| *C09D 11/10* | (2014.01) |
| *G07D 7/1205* | (2016.01) |
| *B42D 25/21* | (2014.01) |
| *B41M 5/00* | (2006.01) |
| *C09D 11/101* | (2014.01) |
| *G07D 7/12* | (2016.01) |

(52) U.S. Cl.
CPC ............. *B42D 25/21* (2014.10); *B42D 25/36* (2014.10); *B42D 25/364* (2014.10); *C09D 11/10* (2013.01); *C09D 11/101* (2013.01); *C09D 11/50* (2013.01); *C09K 19/38* (2013.01); *C09K 19/3857* (2013.01); *C09K 19/3861* (2013.01); *G07D 7/122* (2013.01); *G07D 7/1205* (2017.05); *G07D 7/205* (2013.01); *G07D 7/2033* (2013.01); *B41M 2205/38* (2013.01)

(58) Field of Classification Search
CPC ... B41M 2205/38; B41M 5/023; B42D 25/36; B42D 25/364; C09D 11/50; G07D 7/2033; G07D 7/205
USPC ............................. 428/1.1, 195.1; 283/92, 94
See application file for complete search history.

(56) References Cited

U.S. PATENT DOCUMENTS

| | | | |
|---|---|---|---|
| 6,589,445 B2 | 7/2003 | Sugiyama et al. | |
| 7,108,742 B2 | 9/2006 | Hall-Gaulle et al. | |
| 8,864,037 B2 * | 10/2014 | Callagari et al. | G06K 19/02 235/487 |
| 2007/0224341 A1 | 9/2007 | Kuntz et al. | |
| 2010/0307376 A1 | 12/2010 | Aboutanos et al. | |
| 2011/0293899 A1 | 12/2011 | Tiller et al. | |
| 2013/0256415 A1 | 10/2013 | Callegari et al. | |
| 2014/0178640 A1 | 6/2014 | Jauzein et al. | |

FOREIGN PATENT DOCUMENTS

| | | |
|---|---|---|
| GB | 2330139 | 4/1999 |
| GE | P20135974 B | 11/2013 |
| JP | 2009300662 | 12/2009 |
| WO | 1993022397 | 11/1993 |
| WO | 1995022586 | 8/1995 |
| WO | 2007060133 | 5/2007 |
| WO | 2008000755 | 1/2008 |
| WO | 2008033059 | 3/2008 |
| WO | 2008092522 | 8/2008 |
| WO | 2008128714 | 10/2008 |
| WO | 2009005733 | 1/2009 |
| WO | 2009121605 | 10/2009 |
| WO | 2010115879 | 10/2010 |
| WO | 2010130681 | 11/2010 |
| WO | 2011069689 | 6/2011 |
| WO | 2011069690 | 6/2011 |
| WO | 2011069691 | 6/2011 |
| WO | 2011069692 | 6/2011 |
| WO | 2011147857 | 12/2011 |
| WO | 2012076533 | 6/2012 |
| WO | 2012076534 | 6/2012 |
| WO | 2012160182 | 11/2012 |
| WO | 2013068324 | 5/2013 |
| WO | 2014007807 | 1/2014 |
| WO | 2014095682 | 6/2014 |
| WO | 2013068275 | 10/2014 |

OTHER PUBLICATIONS

International Search Report and Written Opinion issued with respect to application No. PCT/EP2015/056679.
Georgian office action and Search Report in counterpart Georgian Application No. AP 2015014312 dated Nov. 13, 2017 (and English language translation of Relevant Excerpt).

* cited by examiner

↑

↑

II

I

MARKING COMPRISING A CHIRAL LIQUID CRYSTAL POLYMER AND A LUMINESCENT SUBSTANCE

BACKGROUND OF THE INVENTION

1. Field of the Invention

The present invention relates to a marking for an item or article. The marking comprises a chiral liquid crystal polymer (CLCP) in the form of randomly distributed CLCP particles such as, e.g., flakes or in the form of a CLCP layer having randomly distributed craters therein. The detectability of the particles or craters is improved by including a particular luminescent substance in the marking and/or the substrate covered by the marking 2. Discussion of Background Information Every minute billions of items, services and goods are exchanged between people around the world. Some are immaterial and some are tangible, such as, e.g., pharmaceuticals, luxury goods, cigarettes, wine, olive oil, food or banknotes, used for different purposes such as to cure a disease, to provide pleasant moments, to protect us, to pay for something or simply for eating. Although the majority of said items, services and goods is genuine, there is a small part of them that is fake or counterfeit and even worse, may be toxic, especially in the pharmaceutical field or in the case of alcoholic goods. There is not a single day where there will not be a newspaper article somewhere around the world that reports of corresponding problems. This is becoming an increasingly critical problem for all nations and affects not only the economy (at issue are about hundred billions of diversion and counterfeit products) but unfortunately also affects the health of human beings.

For decades attempts to solve this problem have successfully been made, but unfortunately always only for a limited period of time because counterfeiters which now are also linked to criminal organisations develop and improve their skills in parallel with the evolution of the technology and are able to offer to customers fake or non-genuine products which cannot be distinguished from the genuine products by mere visual inspection. This forces the providers of security solutions to constantly be not only up to date, but to be ahead of the counterfeiters in terms of new security features.

In the early days of the development of security features the simple addition of fluorescent compounds to a specific ink was sufficient and may even today still be sufficient as a first level of protection against counterfeit or fake products. But as is often the case, new fake products with markings which mimic the genuine ones have emerged and make it necessary to develop ever more sophisticated and complex inks to overcome this problem.

Another type of security features which has been in use for the last twenty years or so is based upon the random distribution of particles inside a medium. These security features not only deter the selling of counterfeit products because they are difficult to forge, but also provide the ability to create a unique identifier for the items or goods that comprise these security features. The randomly distributed particles may, for example, be CLCP flakes or the like. However, if the CLCP flakes are to be detected by irradiating the security feature and measuring the radiation reflected by the flakes there is the problem that the detectability of radiation reflected by a particular flake by the device that is to capture the reflected radiation depends on the orientation of the flake inside the marking, i.e., its orientation relative to the position of the device. For example, a flake which is oriented parallel to the direction of radiation cannot be detected because in this case there is no incident radiation and thus, no radiation that can be reflected by the flake. It would therefore be advantageous to have available a security feature that comprises randomly distributed CLCP flakes which can be detected by measuring the radiation reflected by the flakes, independently of the orientation of the flakes relative to the position of the source of radiation employed.

A further recently proposed type of security features comprises a CLCP layer which has randomly distributed craters (holes) therein (see International Patent Application PCT/EP2012/076507). The distribution of the craters is a characteristic of the security feature that can be used to verify the authenticity of an item or article provided carrying the security feature by collecting information relating to the radiation that is reflected by the CLCP material and comparing it with corresponding stored information. However, depending on the nature of the substrate on which the CLCP layer with craters is present, the contrast between the CLCP layer and the areas where no CLCP material is present (i.e., the craters) may not be very strong, rendering the detection of (all of) the craters that are present in the CLCP layer difficult and sometimes impossible. It would thus, be advantageous to be able to increase the contrast between the craters and the CLCP material surrounding them and thus, increase the detectability of the craters.

It has surprisingly been found that the drawbacks of the prior art can be overcome by using together with the CLCP material a luminescent substance whose range of luminescence wavelengths at least partially overlaps the range of reflection wavelengths of the CLCP material.

SUMMARY OF THE INVENTION

The present invention provides a marking for identifying and/or authenticating an item or good. The marking comprises at least one luminescent substance (a) and at least one chiral liquid crystal polymer (CLCP) material (b) having a reflection wavelength range that overlaps at least a part of the luminescence wavelength range of (a), at least a part of (a) being located underneath (b).

In one aspect of the marking, the at least one luminescent substance (a) may comprise at least one fluorescent substance.

In another aspect, the marking may comprise (i) a (continuous or discontinuous) first layer comprising (a) and, arranged on top of at least a part of the first layer, (ii) at least a part of (b) in the form of randomly distributed particles comprising (e.g., consisting of) (b) and/or in the form of a (continuous or discontinuous) second layer made of (b) (causing at least a part of the luminescence radiation that passes through the particles or the second layer, i.e., which is not reflected by the CLCP material, to be polarized).

In another aspect of the marking, the first layer may comprise a (preferably UV-) cured resin having the at least one luminescent substance (b) dispersed and/or dissolved therein.

In another aspect of the marking of the present invention, the second layer may be made of at least one CLCP material and may comprise craters which are randomly distributed in the second layer. For example, the craters may have an average size of from 1 µm to 1000 µm, preferably of from 10 µm to 500 µm and/or the average number of craters per $cm^2$ of the second layer may be from 1 to 500, preferably from 5 to 50 and/or at least some of the craters may be invisible to the unaided human eye.

In yet another aspect of the marking, the second layer may comprise a matrix of non-CLCP material and/or of CLCP material that has a reflection wavelength range that does not overlap at least a part of the luminescence wavelength range of (a) that is overlapped by (b), which matrix has particles comprising (e.g., consisting of) (b) randomly distributed therein. For example, the non-CLCP material may be a resin, preferably a UV-curable resin.

In a still further aspect of the marking of the present invention, the marking may comprise (i) a (continuous or discontinuous) layer of non-CLCP material and/or of CLCP material that has a reflection wavelength range that does not overlap at least a part of the luminescence wavelength range of (a) that is overlapped by (b), which layer comprises at least a part of (a) dissolved and/or dispersed therein and, randomly distributed in at least a part of the layer, (ii) particles (preferably substantially two-dimensional particles such as flakes) comprising (e.g., consisting of) (b) randomly distributed in at least a part of the layer (causing at least a part of the luminescence radiation from (a) that passes through the particles to be polarized). In this layer, at least a part of (a) is underneath the particles which consist of or comprise (b) to ensure that luminescence radiation emitted by (a) can pass through virtually each and every particle.

In one aspect of the above marking, the particles may have an average size (of their largest dimension) of from 10 µm to 100 µm and/or may at least in part be present in the form of flakes and/or may be invisible to the unaided human eye.

In another aspect of the various markings according to the present invention as set forth above and below, the at least one CLCP material (b) may be made from a CLCP precursor composition that comprises at least one nematic compound and at least one chiral dopant compound, for example at least one chiral dopant compound of formula (I):

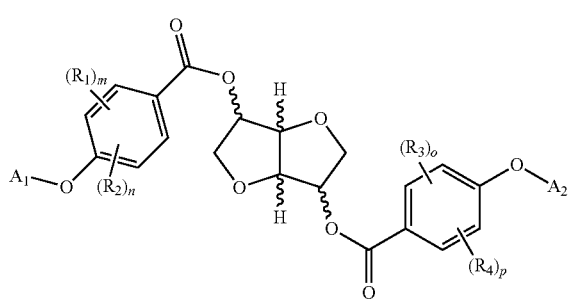

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)$_y$—O]$_z$—C(O)—CH=CH$_2$; (i)

—C(O)-D$_1$-O—[(CH$_2$)$_y$—O]$_z$—C(O)—CH=CH$_2$; (ii)

—C(O)-D$_2$-O—[(CH$_2$)$_y$—O]$_z$—C(O)—CH=CH$_2$; (iii)

$D_1$ denotes a group of formula

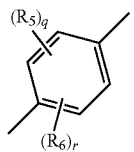

$D_2$ denotes a group of formula

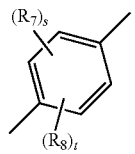

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

The present invention further provides an item or good which comprises on a surface thereof a marking of the present invention as set forth above (including the various aspects thereof).

The present invention further comprises an item or good having a marking on a surface thereof, at least a part of the surface of the item or good having the marking thereon comprising at least one luminescent substance (a) and at least a part of the marking comprising at least one chiral liquid crystal polymer (CLCP) material (b) having a reflection wavelength range that overlaps at least a part of the luminescence wavelength range of (a).

In one aspect of the item or good, at least a part of (b) may be present as randomly distributed particles comprising (e.g. consisting of) (b) as such and/or may be present as particles which are randomly dispersed in a (continuous or discontinuous) layer of non-CLCP material and/or of CLCP material that has a reflection wavelength range that does not overlap at least a part of the luminescence wavelength range of (a) that is overlapped by (b). Alternatively or additionally, at least a part of (b) may be present in the form of a (continuous of discontinuous) layer having randomly distributed craters therein.

The marked item or good of the present invention set forth above may be or comprise at least one of a label, packaging, a cartridge, a container or a capsule that contains foodstuffs, nutraceuticals, pharmaceuticals or a beverage, a banknote, a credit card, a stamp, a tax label, a security document, a passport, an identity card, a driver's license, an access card, a transportation ticket, an event ticket, a voucher, an ink-transfer film, a reflective film, an aluminum foil, or a commercial good.

The present invention further provides a method of marking an item or good. The method comprises providing the item or good with a marking according to the present invention as set forth above (including the various aspects thereof).

In one aspect of the method, the method may comprise the following steps: (I) applying a curable resin or varnish having a luminescent substance dispersed and/or dissolved therein onto at least a part of the outer surface of the item or article to form a first (continuous or discontinuous) layer and, optionally, at least partially curing the resin or varnish, (II) applying on top of at least a part of the first layer a CLCP precursor composition to form a second (continuous or discontinuous) layer and, optionally, heating the applied precursor composition to promote the chiral liquid crystal state thereof, and (III) curing the precursor composition and, optionally, the not yet or not yet fully cured resin or varnish of the first layer. The application and curing of the CLCP precursor composition is effected to result in a random formation of craters in at least a part of the cured second layer. For example, the mean diameter and/or the density of the randomly distributed craters formed in the cured second (CLCP) layer may be controlled by controlling at least one parameter selected from one or more of the degree of wetting of the first layer by the CLCP precursor composition, the length of the time period elapsing between the application and the curing of the CLCP precursor composition, the thickness of the applied layer of the CLCP precursor composition, the viscosity of the CLCP precursor composition, and the method of applying the CLCP precursor composition onto the first layer.

In another aspect of the method, the method may comprise the following steps: (I') applying a first curable resin or varnish having the at least one luminescent substance (a) dispersed and/or dissolved therein onto at least a part of the outer surface of the item or good to form a first (continuous or discontinuous) layer and, optionally, at least partially curing the first resin or varnish, (II') applying onto at least a part of the first layer a second curable resin or varnish having particles comprising the at least one CLCP material (b) (preferably substantially two-dimensional particles such as flakes) randomly distributed therein to form a second (continuous or discontinuous) layer on top of at least a part of the first layer, and (III') curing the second resin or varnish and, optionally, the not yet or not yet fully cured first resin or varnish. For example, the first curable resin or varnish and the second curable resin or varnish may be identical.

In yet another aspect of the method, the method may comprise (I") applying a curable resin having the at least one luminescent substance (a) dispersed and/or dissolved therein onto at least a part of the outer surface of the item or good to form a layer and, optionally, at least partially curing the resin, (II") randomly distributing on top of at least a part of the layer particles comprising the at least one CLCP material (b) and, optionally, (III") curing the not yet or not yet fully cured resin.

In still further aspect of the above method, the method may comprise the application of a curable resin or varnish having a luminescent substance dispersed and/or dissolved therein and further having particles comprising a CLCP material (preferably substantially two-dimensional CLCP particles such as flakes) randomly dispersed therein onto at least a part of the outer surface of the item or good to form a (continuous or discontinuous) layer, and the subsequent curing of the resin or varnish.

In another aspect, the method may comprise applying the at least one chiral liquid crystal polymer (CLCP) material (b) onto at least a part of the surface of an item or good that comprises the at least one luminescent substance (a). For example, (b) may be applied in the form of (1) particles comprising (b) as such and/or in the form of (2) a curable resin having particles comprising (b) dispersed therein and/ or in the form of (3) a layer of (b) having randomly distributed craters therein.

The present invention further provides a method of at least one of identifying, authenticating, tracking, and tracing an item or good provided with a marking according to the present invention as set forth above (including the various aspects thereof) and/or a marking that is obtainable by the method according to the present invention as set forth above (including the various aspects thereof). The method comprises (i) irradiating the marking with radiation that comprises an excitation wavelength of the at least one luminescent substance (a) and (ii) detecting and optionally analyzing the luminescence radiation emitted by the marking In one aspect of the above method, step (ii) thereof may comprise detecting the emitted radiation by using a filter for right-handed polarized light and/or a filter for left-handed polarized light. For example, information relating to radiation detected with one filter may be subtracted from information regarding the radiation detected with the other filter.

In another aspect of the method, data relating to an image of randomly distributed craters or data relating to an image of randomly distributed CLCP particles may be collected and compared to stored data.

The present invention further provides a method of improving the detectability of a crater present in a (continuous or discontinuous) chiral liquid crystal polymer (CLCP) layer of a marking on an item or good. The method comprises providing underneath at least the portion of the CLCP layer that comprises the crater a luminescent substance having a luminescence wavelength range that at least partially overlaps the reflection wavelength range of the CLCP, causing at least a part of the luminescence radiation from the at least one luminescent substance that passes through the CLCP layer (i.e., is not reflected thereby) to be polarized and less intense than the luminescence radiation that passes through the crater.

The present invention further provides a method of making the detectability of a substantially two-dimensional particle comprising a chiral liquid crystal polymer (CLCP) material that is present as such or in a (continuous or discontinuous) resin layer upon irradiating the particle or layer with a source of radiation independent of the orientation of the particle relative to the source of radiation. The method comprises (i) providing underneath the particle or underneath at least the portion of the resin layer that comprises the particle a luminescent substance having a luminescence wavelength range that at least partially overlaps the reflection wavelength range of the CLCP material or (ii) including the luminescent substance directly in the resin layer comprising the particle, provided that the resin layer itself does not overlap the luminescence wavelength range of the at least one luminescent substance.

BRIEF DESCRIPTION OF THE DRAWINGS

The present invention is further described in the detailed description which follows, in reference to the plurality of drawings by way of non-limiting examples of exemplary embodiments of the present invention, wherein.

DETAILED DESCRIPTION OF THE PRESENT INVENTION

Figure 1:
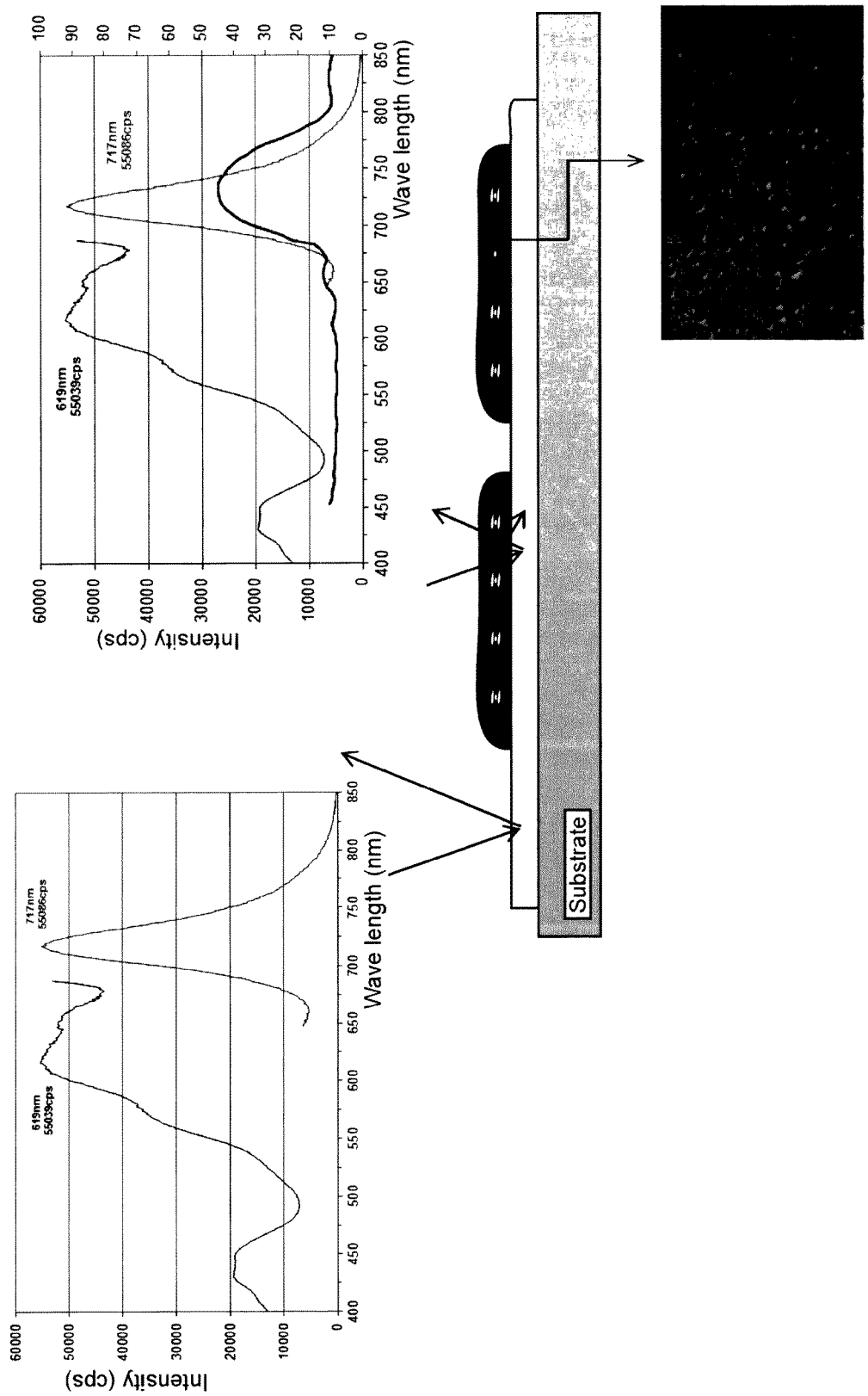
FIG. 1 schematically shows a substrate carrying thereon a marking according to the present invention with randomly distributed craters in a layer of CLCP material.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise. For example, reference to "a CLCP material" would also mean that mixtures of one or more CLCP materials can be present unless specifically excluded.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the disclosure of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

In the marking of the present invention the layer or layers thereof can be continuous or discontinuous. If a layer is discontinuous it may, for example, be present in the form of a pattern, a logo, stripes, etc. In other words, in the case of a discontinuous layer the layer comprises one or more areas in which no material (e.g., resin or CLCP material) is present. Further, the layers may have any conceivable shape such as, e.g., rectangular, trapezoidal, triangular, circular, ellipsoidal, or irregular.

It further is to be appreciated that the marking of the present invention is not limited to the required layer or layers set forth herein. Rather, the marking may comprise one or more additional (continuous or discontinuous) layers underneath, on top of and/or between at least a part of the required layer or layers. Merely by way of example, there may be one or more layers between at least a part of the first and second layers, which optional layers may comprise additional materials that can be used for authenticating, identification and tracking or tracing purposes (e.g., pigments, dyes, magnetic materials, particles, to name but a few). Of course, corresponding layers would have to be at least partly transparent for the excitation and emission wavelengths of the at least one luminescent substance and also must not otherwise make it impossible to achieve the objectives set forth above.

Any luminescent substance that can be dispersed and dissolved in a material that is suitable for forming the (first) layer (e.g., a curable resin or varnish whose reflection wavelength band or range does not overlap the luminescence wavelength band or range of the luminescent substance to any significant extent) of the marking of the present invention is suitable for use in the present invention. Preferably, the at least one luminescent substance is or comprises a fluorescent substance, i.e., a substance that emits radiation substantially immediately after it has been irradiated with radiation of an excitation wavelength of the luminescent substance. The substance may be visible or invisible to the human eye (e.g., may absorb radiation only in the IR range). Non-limiting examples of luminescent substances which are suitable for use in the present invention include (optionally polymer-bonded) perylene, terrylene, quaterrylene and VAT dyes. In this regard, WO 2011/147857, WO 2012/160182, WO 2013/068275, WO 2013/068324 and US 2011/0293899 A1 may, for example, be referred to. Luminescent compounds in pigment form have also been widely used in printing inks and other preparations (see, e.g., U.S. Pat. No. 6,565,770, WO 2008/033059, WO 2008/092522). Examples of luminescent pigments can be found in certain classes of inorganic compounds, such as the sulphides, oxysulphides, phosphates, vanadates, garnets, spinels, etc. of nonluminescent cations, doped with at least one luminescent transition metal or rare earth metal cation. Another class of luminescent compounds is formed by certain rare earth metal complexes such as described in WO 2009/005733A, WO 2010/130681, US 2010/0307376 A1 and U.S. Pat. No. 7,108,742.

According to the present invention, at least a part of the luminescence (preferably fluorescence) wavelength band or range of a luminescent substance (which preferably is in at least one of the visible, UV, near-UV, IR and near-IR wavelength ranges of the electromagnetic spectrum) overlaps at least a part of the reflection wavelength band or range of a CLCP material (which correspondingly also is preferably in at least one of the visible, UV, near-UV, IR and near-IR wavelength ranges of the electromagnetic spectrum). In this regard, it is to be appreciated that the luminescence radiation of a luminescent substance is not limited to a single wavelength but is in the form of an (essentially symmetrical) intensity band having a maximum (peak) at a certain wavelength and extending over a range of emission (luminescence) wavelengths. This range of emission wavelengths may be relatively narrow, e.g., only 20-50 nm or even narrower, but may also be relatively broad, e.g., 100-200 nm or even broader. In this regard, see FIGS. 6a and 7, which show examples of the luminescence wavelength band of two luminescent compounds. Substantially the same applies to the reflection wavelength band or range of a CLCP material. In this case there is a wavelength at which the CLCP material shows a maximum reflection and on both sides of this wavelength there are radiation wavelengths which are reflected to a lesser degree. As in the case of the emitted luminescence radiation, the reflection wavelength peak width can range from very narrow to very broad. See, for example, FIG. 6b which shows the reflection wavelength band of a CLCP material and the luminescence wavelength band of a luminescent compound employed in combination therewith.

In the present invention the luminescence wavelength range and the reflection wavelength range overlap to at least some degree to ensure that a significant portion of the luminescence radiation is reflected by the CLCP material to afford a significant difference in intensity between luminescence radiation that is reflected by the CLCP material and luminescence radiation that does not come into contact with the CLCP material. For example, at least 10%, e.g., at least 20%, at least 30%, at least 40%, at least 50%, at least 60%, at least 70%, at least 80%, or at least 90% of the luminescence wavelength range of the luminescent substance (in terms of wavelengths) may be overlapped by the reflection wavelength range of the CLCP material and/or at least at least 10%, e.g., at least 20%, at least 30%, at least 40%, at least 50%, at least 60%, at least 70%, at least 80%, or at least 90% of reflection the wavelength range of the CLCP material may be overlapped by the luminescence wavelength range of the luminescent substance.

Accordingly, if a predetermined CLCP material is to be employed for making the marking, one will have to determine the reflection wavelength range thereof (unless already known) and then select a luminescence substance whose luminescence wavelength range overlaps the reflection wavelength range to a significant extent. Conversely, if a predetermined luminescent substance is to be employed, one will have to determine the luminescence wavelength range thereof (unless already known) and then select a CLCP material whose reflection wavelength range overlaps the luminescence wavelength range to a significant extent. In practice, it will often be more convenient to adjust the reflection wavelength range to cause it to significantly overlap a given luminescence wavelength range. For example, the reflection wavelength range of a CLCP material can be changed, e.g., by changing the ratio of nematic compound(s) and chiral dopant(s) used for making the CLCP material and/or by incorporating certain salts in the CLCP precursor composition (in this regard see, for example, WO 2012/076533) and/or by modifying the CLCP precursor composition following the application thereof (as set forth in more detail below).

A suitable concentration of the luminescence substance in the (first) layer depends on several factors such as, e.g., the intensity of the luminescence radiation provided by the substance, the intensity of the reflection provided by the CLCP material, the degree of overlap between luminescence and reflection wavelength ranges, the sensitivity of the apparatus to be used for detecting reflected radiation, etc. At any rate, a suitable concentration can be determined by one of skill in the art by mere routine experimentation. Further, while more than one luminescent substance may be employed in the marking of the present invention, the use of a single luminescent substance will usually be sufficient, at least unless randomly distributed particles which comprise two or more different CLCP materials or a CLCP layer with craters whose optical (reflection) properties have been modified in one or more areas thereof (see below) are to be employed.

The material that forms the layer in which the at least one luminescent material is present and also forms the layer in which particles that comprise a CLCP material are randomly dispersed can be any resin or varnish that is suitable for this purpose and is at least partly and preferably completely transparent in the cured state for radiation that causes the at least one luminescent substance to luminesce (i.e. the excitation wavelength) and is at least partly and preferably completely transparent for the luminescence radiation emitted by the luminescent substance. Preferably, the material is a UV-curable resin, although resins which are curable in any other manner (thermally, by electron beams, X-rays, etc.) may be used as well. Corresponding resins and methods or curing them are well known to those of skill in the art. Non-limiting examples of suitable resins include acrylate resins such as, e.g., resins based on one or more polymerizable monomers comprising one or more groups of formula $H_2C=CH-C(O)-$ or $H_2C=C(CH_3)-C(O)-$. Examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates.

The at least one CLCP material that is either used for making the second (continuous or discontinuous) layer having randomly distributed craters therein of the marking of the present invention or is comprised in the particles (e.g., flakes) which are randomly dispersed in the second layer or in the layer that also comprises the at least one luminescent substance can be any known chiral (cholesteric) liquid crystal polymer.

For example, the CLCP precursor composition for making the layer or particle (or part of the particle in the case of a composite particle) may comprise at least one nematic compound, at least one chiral dopant, at least one photoinitiator and, optionally, at least one solvent. Non-limiting (and preferred) examples of corresponding compositions are disclosed in, for example, WO 2008/000755, WO 2010/115879, WO 2011/069689, WO 2011/069690, WO 2011/069691 and WO 2011/069692.

By way of background, cholesteric (chiral) liquid crystals exhibit a viewing-angle dependent color. When illuminated with white light the cholesteric liquid crystal structure reflects light of a predetermined color (predetermined wavelength range) which is a function of the employed materials and generally varies with the angle of observation and the temperature. The precursor material itself is colorless and the observed color (predetermined wavelength range) is only due to a physical reflection effect at the cholesteric helical structure adopted at a given temperature by the liquid crystal material (cf. J. L. Fergason, Molecular Crystals, Vol. 1, pp. 293-307 (1966)). In particular, in liquid crystal materials the cholesteric helical structure is "frozen" in a predetermined state through polymerization and thus rendered temperature-independent.

The chiral nematic liquid crystal phase is typically composed of nematic mesogenic molecules which comprise a chiral dopant that produces intermolecular forces that favor alignment between molecules at a slight angle to one another. The result thereof is the formation of a structure which can be visualized as a stack of very thin 2-D nematic-like layers with the director in each layer twisted with respect to those above and below. An important characteristic of the chiral nematic liquid crystal phase is the pitch p. The pitch p is defined as the (vertical) distance it takes for the director to rotate one full turn in the helix.

A characteristic property of the helical structure of the chiral nematic phase is its ability to selectively reflect light whose wavelength falls within a specific range. When this range overlaps with a portion of the visible spectrum a colored reflection will be perceived by an observer. The center of the range is approximately equal to the pitch multiplied by the average refractive index of the material. One parameter which has an influence on the pitch is the temperature because of the dependence thereon of the gradual change in director orientation between successive layers which modifies the pitch length, resulting in an alteration of the wavelength of reflected light as a function of the temperature.

A non-limiting example of a CLCP precursor composition that is suitable for use in the present invention comprises (A) from 20% to 99.5% by weight, based on the total weight of the composition, of at least one three-dimensionally crosslinkable nematic compound of formula $$Y^1\text{-}A^1\text{-}M^1\text{-}A^2\text{-}Y^2$$

wherein $Y^1$, $Y^2$ are equal or different, and represent polymerizable groups;

$A^1$, $A^2$ are equal or different residues of the general formula $C_nH_{2n}$, wherein n is 0 or an integer of from 1 to 20, and wherein at least one methylene group may be replaced by an oxygen atom;

$M^1$ is of formula 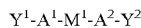—$X^1$—$R^2$—$X^2$—$R^3$—$X^3$—$R^4$— wherein $R^1$ to $R^4$ are equal or different bivalent residues selected from —O—, —COO—, —COHN—, —CO—, —S—, —C=C—, CH—CH—, —N=N—, —N=N(O)—, and a C—C bond; and $R^2$—$X^2$—$R^3$ or $R^2$—$X^2$ or $R^2$—$X^2$—$R^3$— $X^3$ may as well be a C—C bond;

$X^1$ to $X^3$ are equal or different residues selected from 1,4-phenylene; 1,4-cyclohexylene; heteroarylenes having from 6 to 10 atoms in the aryl core, 1 to 3 of which are heteroatoms selected from O, N, and S, and carrying substituents $B^1$, $B^2$ and/or $B^3$; cycloalkylenes having from 3 to 10 carbon atoms and carrying substituents $B^1$, $B^2$ and/or $B^3$; wherein $B^1$ to $B^3$ are equal or different substituents selected from hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthio carbonyl, —OH, —F, —Cl, —Br, —I, —CN, —NO₂, formyl, acetyl, and alkyl-, alkoxy-, or alkylthio-residues with 1 to 20 carbon atoms having a chain interrupted by ether oxygen, thioether, sulfur or ester groups; and (B) from 0.5% to 80% by weight, based on the total weight of the composition, of at least one chiral compound of the formula $$V^1\text{-}A^1\text{-}W^1\text{-}Z\text{-}W^2\text{-}A^2\text{-}V^2$$

wherein $V^1$, $V^2$ are equal or different and represent a residue of the following: acrylate, methacrylate, epoxy, vinyl ether, vinyl, isocyanate, $C_1$-$C_{20}$-alkyl, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthio-carbonyl, —OH, —F, —Cl, —Br, —I, —CN, —NO₂, formyl, acetyl, as well as alkyl-, alkoxy-, or alkylthio-residues with 1 to 20 carbon atoms having a chain interrupted by ether oxygen, thioether sulfur or ester groups, or a cholesterol residue;

$A^1$, $A^2$ are as indicated above;

$W^1$, $W^2$ are of formula —$R^1$—$X^1$—$R^2$—$X^2$—$R^3$— wherein $R^1$ to $R^3$ are as indicated above, and wherein $R^2$ or $R^2$—$X^2$ or $X^1$—$R^2$—$X^2$—$R^3$ may also be a C—C bond;

$X^1$, $X^2$ are as indicated above;

Z is a divalent chiral residue chosen from dianhydrohexites, hexoses, pentoses, binaphthyl derivatives, biphenyl derivatives, derivatives of tartaric acid, and optically active glycols, and a C—C bond in the case where $V^1$ or $V^2$ is a cholesterol residue.

Component (B) can, for example, be selected from one or more of (2-[4-(acryloyloxy)-benzoyl]-5-(4-methoxybenzoyl)-isosorbide), (di-2,5-[4-(acryloloxy)-benzoyl]-isosorbide), and (di-2,5[(4'-acryloyloxy)-benzoyl]-isomamide).

The precursor composition for making the CLCP layer or particle for use in the present invention preferably comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be four to thirty times the (total) concentration of the one or more cholesteric compounds B. Generally, a precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition for making the marking of the present invention are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) to formula (ID) set forth below). For example, the nematic compounds A may comprise one or more groups of formulae (i) to (iii) which are indicated below as meanings for $A_1$ and $A_2$ in formula (I) (and formulae (IA) to (ID)), typically bonded to optionally substituted phenyl groups. Non-limiting specific examples of nematic compounds which are suitable for use in the present invention include 2-methoxybenzene-1,4-diyl bis[4-({[4-(acryloyloxy)butoxy]carbonyl}oxy)benzoate];

4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;
2-methoxybenzene-1,4-diyl bis[4-({[4-(acryloyloxy)butoxy]carbonyl}oxy)-2-methyl-benzoate];
2-methylbenzene-1,4-diyl bis[4-({[4-(acryloyloxy)butoxy]carbonyl}oxy)-2-methyl-benzoate];
4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;
2-methylbenzene-1,4-diyl bis[4-({[4-(acryloyloxy)butoxy]carbonyl}oxy)benzoate];
2-methylbenzene-1,4-diyl bis[4-({[4-(acryloyloxy)butoxy]carbonyl}oxy)-3-methoxy-benzoate];
4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;
2-methylbenzene-1,4-diyl bis[4-({[4-(acryloyloxy)butoxy]carbonyl}oxy)-3,5-dimethoxy-benzoate];
2-methoxybenzene-1,4-diyl bis[4-({[4-(acryloyloxy)butoxy]carbonyl}oxy)-3,5-di-methoxybenzoate];
4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate;
4-({4-[4-(acryloyloxy)butoxy]benzoyl}oxy)-3-methylphenyl 4-[4-(acryloyloxy)butoxy]-2-methylbenzoate;
4-({4-[4-(acryloyloxy)butoxy]benzoyl}oxy)-3-methylphenyl 4-[4-(acryloyloxy)butoxy]-3-methylbenzoate;
2-methylbenzene-1,4-diyl bis{4-[4-(acryloyloxy)butoxy]-2-methylbenzoate};
4-({4-[4-(acryloyloxy)butoxy]-2-methylbenzoyl}oxy)-3-methylphenyl 4-[4-(acryloyl-oxy)butoxy]-2,5-dimethylbenzoate;
2-methylbenzene-1,4-diyl bis{4-[4-(acryloyloxy)butoxy]-2,5-dimethylbenzoate} 2-methylbenzene-1,4-diyl bis{4-[4-(acryloyloxy)butoxy]benzoate};
4-({4-[4-(acryloyloxy)butoxy]-3,5-dimethylbenzoyl}oxy)-3-methylphenyl 4-[4-(acryloyloxy)butoxy]-2,5-dimethyl-benzoate;
2-methylbenzene-1,4-diyl bis{4-[4-(acryloyloxy)butoxy]-3,5-dimethylbenzoate};
2-methoxybenzene-1,4-diyl bis{4-[4-(acryloyloxy)butoxy]-3,5-dimethylbenzoate};
4-({4-[4-(acryloyloxy)butoxy]-3-methylbenzoyl}oxy)-2-methoxyphenyl 4-[4-(acryloyl-oxy)butoxy]-3,5-dimethylbenzoate;
2-methoxybenzene-1,4-diyl bis{4-[4-(acryloyloxy)butoxy]-3-methylbenzoate};
4-({4-[4-(acryloyloxy)butoxy]benzoyl}oxy)-3-methoxyphenyl 4-[4-(acryloyloxy)-butoxy]-3-methylbenzoate;
4-({4-[4-(acryloyloxy)butoxy]benzoyl}oxy)-3-methoxyphenyl 4-[4-(acryloyloxy)-butoxy]-2,5-dimethylbenzoate;
2-methoxybenzene-1,4-diyl bis{4-[4-(acryloyloxy)butoxy]-2-methoxybenzoate};
2-methoxybenzene-1,4-diyl bis{4-[4-(acryloyloxy)butoxy]-3,5-dimethoxybenzoate};
2-methoxybenzene-1,4-diyl bis{4-[4-(acryloyloxy)butoxy]-3-methoxybenzoate};
2-ethoxybenzene-1,4-diyl bis{4-[4-(acryloyloxy)butoxy]benzoate};
2-ethoxybenzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]benzoate};
4-({4-[4-(acryloyloxy)butoxy]benzoyl}oxy)-2-(propan-2-yloxy)phenyl 4-[4-(acryloyl-oxy)butoxy]-2-methylbenzoate;
2-(propan-2-yloxy)benzene-1,4-diyl bis{4-[4-(acryloyloxy)butoxy]-2-methylbenzoate};
2-(propan-2-yloxy)benzene-1,4-diyl bis{4-[4-(acryloyloxy)butoxy]-2,5-dimethyl-benzoate};
2-(propan-2-yloxy)benzene-1,4-diyl bis{4-[4-(acryloyloxy)butoxy]-3,5-dimethyl-benzoate}; and
2-(propan-2-yloxy)benzene-1,4-diyl bis{4-[4-(acryloyloxy)butoxy]-3,5-dimethoxy-benzoate}.

The one or more cholesteric (i.e., chiral dopant) compounds B for use in the present invention preferably comprise at least one polymerizable group.

Suitable examples of the one or more chiral dopant compounds B include those of formula (I):

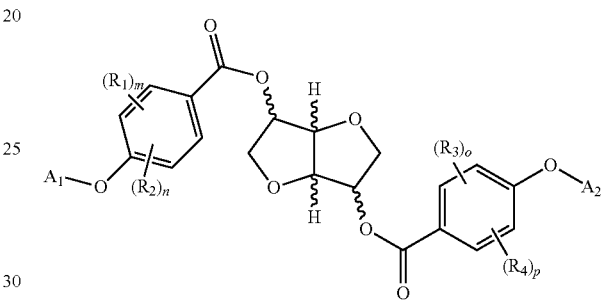

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

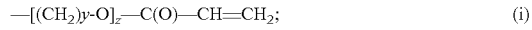  (i)

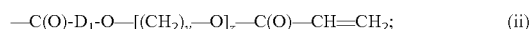  (ii)

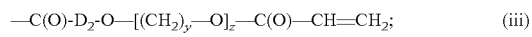  (iii)

$D_1$ denotes a group of formula

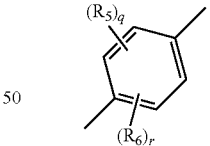

$D_2$ denotes a group of formula

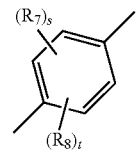

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

Chiral dopant compounds B of formula (I) include compounds of the following formulae (IA), (IB), (IC) and (ID):

(IA)

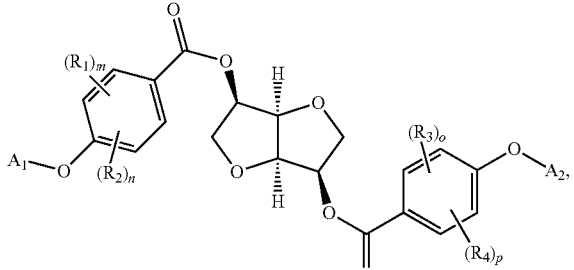

(IB)

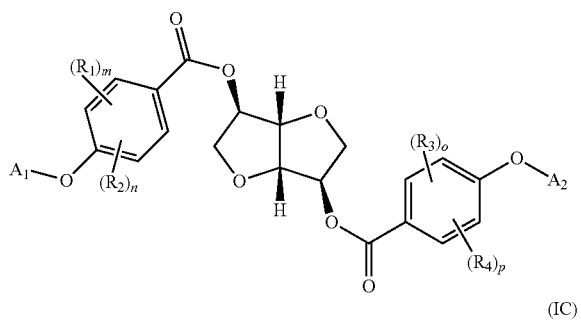

(IC)

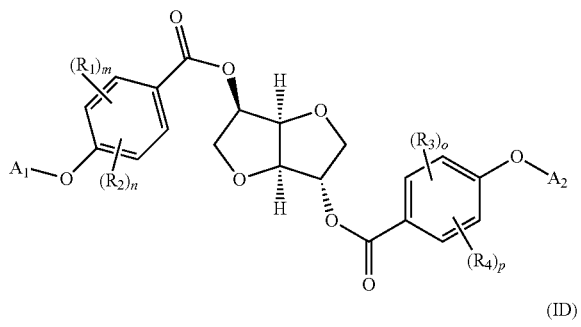

(ID)

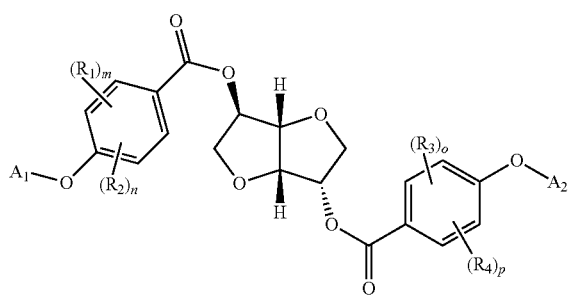

In each of the above formulae (IA), (IB), (IC) and (ID):
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)$y$-O]$z$-C(O)—CH=CH$_2$;  (i)

—C(O)-D$_1$-O—[(CH$_2$)$y$-O]$z$-C(O)—CH=CH$_2$;  (ii)

—C(O)-D$_2$-O—[(CH$_2$)$y$-O]$z$-C(O)—CH=CH$_2$;  (iii)

$D_1$ denotes a group of formula

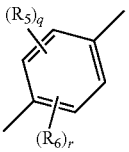

$D_2$ denotes a group of formula

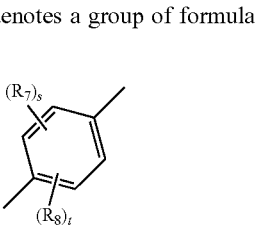

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formulae (IA), (IB), (IC) and (ID) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formulae (IA), (IA'), (IB) and (IB' (and in formula (I)) each independently denote $C_1$-$C_6$ alkoxy.

In another embodiment of the compounds of formula (I) and of formulae (IA), (IB), (IC) and (ID), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and in formulae (IA), (IB), (IC) and (ID) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formulae (IA), (IB), (IC) and (ID) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formulae (IA), (IB), (IC) and (ID) (and in formula (I)) each independently denote a group of formula —C(O)-D$_1$-O-[(CH$_2$)$_y$—O]$_z$—C(O)—CH=CH$_2$ and/or a group of formula —C(O)-D$_2$-O—[(CH$_2$)$_y$—O]—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA), (IB), (IC) and (ID) may comprise 1, 2, 3, 4, 5 or 6 carbon atoms (such as, e.g., methyl, methoxy, ethyl, ethoxy, propyl, propoxy, isopropyl, isopropoxy, butyl, butoxy, pentyl, pentoxy, hexyl, hexoxy) and in particular, 4 or 6 carbon atoms.

Examples of alkyl groups comprising 3 or 4 carbon atoms include isopropyl and butyl. Examples of alkyl groups comprising 6 carbon atoms include hexyl, 2-methylpentyl, 3-methylpentyl, 2,2-dimethylbutyl, and 2,3-dimethylbutyl.

Examples of alkoxy groups comprising 3 or 4 carbon atoms include isopropoxy, but-1-oxy, but-2-oxy, and tent-butoxy. Examples of alkoxy groups comprising 6 carbon atoms include hex-1-oxy, hex-2-oxy, hex-3-oxy, 2-methylpent- 1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylbut-1-oxy, 2,2-dimethylbut-3-oxy, 2,2-dimethylbut-4-oxy, 4,4-dimethylbut-1-oxy, 2,3-dimethylbut-1-oxy, 2,3-dimethylbut-2-oxy, 2,3-dimethylbut-3-oxy, and 3,4-dimethylbut-1-oxy.

Non-limiting specific examples of chiral dopant compounds B of formula (I) which are suitable for use in the present invention include
(3R,3aR,6R,6aR)-hexahydrofuro[3,2-b]furan-3,6-diyl bis (4-(4-(acryloyloxy)-3-methoxybenzoyloxy)-3-methoxybenzoate);
(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxybenzoate;
(3R,3aR,6R,6aR)-hexahydrofuro[3,2-b]furan-3,6-diyl bis (4-(4(acryloyloxy)benzoyloxy)-benzoate);
(3R,3aR,6R,6aR)-hexahydrofuro[3,2-b]furan-3,6-diyl bis (4-(4-(acryloyloxy)butoxy)-benzoate);
(3R,3aR,6R,6aR)-hexahydrofuro[3,2-b]furan-3,6-diyl bis (4-(acryloyloxy)-2-methyl-benzoate);
(3R,3aR,6S,6aR)-hexahydrofuro[3,2-b]furan-3,6-diyl bis(4-(4-(acryloyloxy)benzoyloxy)-3-methoxybenzoate);
(3R,3aR,6R,6aR)-hexahydrofuro[3,2-b]furan-3,6-diyl bis (4-(4-(acryloyloxy)-3-methoxy-benzoyloxy)benzoate);
(3R,3aR,6R,6aR)-hexahydrofuro[3,2-b]furan-3,6-diyl bis (4-(4(acryloyloxy)benzoyloxy)-3-methoxybenzoate);
2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;
2,5-bis-O-(4-{[4-(acryloyloxy)benzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;
2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol
2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;
2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;
2,5-bis-O-(4-{[4-(acryloyloxy)benzoyl]oxy}-3-methoxybenzoyl)-1,4:3,6-dianhydro-D-mannitol;
2-O-(4-{[4-(acryloyloxy)-2-methoxybenzoyl]oxy}-2,5-dimethylbenzoyl)-5-O-(4-{[4-(acryloyloxy)-3 -methoxybenzoyl]oxy}-3-methylbenzoyl)-1,4:3,6-dianhydro-D-mannitol;
2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;
2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;
2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;
2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;
2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;
2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;
2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;
2,5-bis-O-(4-{[4-(acryloyloxy)-2,5-dimethylbenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-ethoxybenzoyl)-1,4:3,6-dianhydro-D-mannitol;
2,5-bis-O-(4-{[4-(acryloyloxy)-2-methoxybenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-methoxybenzoyl)-1,4:3,6-dianhydro-D-mannitol;
2,5-bis-O-(4-{[4-(acryloyloxy)-2-ethoxybenzoyl]oxy}-3-methylbenzoyl)-1,4:3,6-dianhydro-D-mannitol;
2,5-bis-O-(4-{[4-(acryloyloxy)-2-ethoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;
2,5-bis-O-(4-{[4-(acryloyloxy)benzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;
2-O-(4-{[4-(acryloyloxy)-2,5-dimethylbenzoyl]oxy}-2-methoxybenzoyl)-5-)-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2,5-bis-O-(4-{[4-(acryloyloxy)benzoyl]oxy}-3-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;

2-O-(4- {[4-(acryloyloxy)benzoyl]oxy}-2-ethoxy-5-methylbenzoyl)-5-)-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol 2-O-(4-{[4-(acryloyloxy)-3-ethoxybenzoyl]oxy}benzoyl)-5-)-(4-{[4-(acryloyloxy)-2-methylbenzoyl]oxy}-2-ethoxybenzoyl)-1,4:3,6-dianhydro-D-glucitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol 2,5-bis-O-(4-{[4-(acryloyloxy)-2,5-dimethylbenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-ethoxybenzoyl)-1,4:3,6-dianhydro-D-glucitol;

2,5-bis-O-(4-{[4-(acryloyloxy)-2-methoxybenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-methoxybenzoyl)-1,4:3,6-dianhydro-D-glucitol;

2,5-bis-O-(4-{[4-(acryloyloxy)-2-ethoxybenzoyl]oxy}-3-methylbenzoyl)-1,4:3,6-dianhydro-D-glucitol; and 2,5-bis-O-(4-{[4-(acryloyloxy)-2-ethoxybenzoyl]oxy}-3-methoxybenzoyl)-1,4:3,6-dianhydro-D-glucitol.

The one or more chiral dopant compounds B will usually be present in a total concentration of from 0.1% to 30% by weight, e.g., from 0.1% to 25%, or from 0.1% to 20% by weight, based on the total weight of the composition. The best results will often be obtained with concentrations of from 3% to 10% by weight, e.g., from 5% to 8% by weight, based on the total weight of the precursor composition. The one or more nematic compounds A will often be present in a concentration of from 30% to 50% by weight, based on the total weight of the precursor composition.

In one embodiment of the marking of the present invention, the marking comprises a second layer of a CLCP material (in the form of, e.g., film or regular or irregular pattern) that comprises randomly distributed craters (holes and/or pinholes), preferably of controlled average size (e.g., diameter) and/or controlled density. In this regard, the disclosure of International Patent Application PCT/EP2012/076507 may, for example, be referred to. The randomly distributed craters may (and often will) be substantially circular or even perfectly circular. It is to be appreciated, however, that the craters may also be, or may include craters having shapes which are not circular but are, e.g., ellipsoidal. In this case the shape of the craters provides a fingerprint which can be used to create a code which is based not merely one the density and/or size and/or distribution of the craters, but also on the shape of (some or all of) the craters.

The CLCP layer of the marking of the present invention may be obtained, for example, by applying a liquid CLCP precursor composition onto the first layer (or an optional intermediate layer, see above) in the form of a continuous or discontinuous layer, optionally heating the applied composition to promote the chiral liquid crystal state thereof, and curing the CLCP precursor composition to form the layer having randomly distributed craters in at least a part thereof and by controlling at least one parameter which affects the average size and/or density of the randomly distributed craters comprised in the CLCP layer or pattern.

The at least one parameter which affects the average size and/or the density of the randomly distributed craters may, for example, include the degree of wetting of the substrate by the precursor composition. The degree of wetting depends on the difference between the surface tension of the CLCP precursor composition and the surface tension of the first layer or of an optional intermediate layer present on the first layer. For example, if the precursor composition wets the first or intermediate layer well (i.e., the difference between the surface tension of the first or intermediate layer and the surface tension of the CLCP precursor composition after evaporation of volatile matter is small), the density and the average size of the craters tend to be small. Conversely, an increasingly larger difference between the surface tensions of the first layer or intermediate layer and the CLCP precursor composition will result in an increasingly higher number and/or average size of formed craters.

The degree of wetting of the first or intermediate layer by the precursor composition may be controlled by, for example, adjusting (changing) the surface tension of the precursor composition. It may also be controlled by adjusting the surface tension of the surface of the first or intermediate layer. The surface tension of the first or intermediate layer can be adjusted, for example, by providing the first or intermediate layer at least in a part of the surface thereof onto which the precursor composition is to be applied with a coating that has a surface tension that is different from the surface tension of the first or intermediate layer. A preferred difference between the surface tension of the first or intermediate layer (or the coating provided thereon) and the surface tension of the CLCP precursor composition (after evaporation of volatile matter optionally comprised therein) will often be from 0.1 mN·m to 10 mN·m, preferably from 0.5 mN·m to 5 mN·m. Preferably, the surface tension of the precursor composition (after evaporation of volatile matter) is higher than the surface tension of the surface of the first or intermediate layer or the coating onto which the composition is to be applied.

The surface tension of the CLCP precursor composition can be changed by, for example, incorporating one or more surfactants therein. Non-limiting examples of suitable surfactants include polysiloxane surfactants and fluorinated surfactants (e.g., surfactants based on polytetrafluoroethylene). The efficiency of a surfactant for lowering the surface tension of a specific precursor composition depends mainly on the structure of the surfactant and can be determined by simple experimentation. In this regard, it is to be kept in mind that adding too much surfactant to a precursor composition may impair the wetting properties of the composition. In many cases a suitable (total) concentration of the one or more surfactants in the precursor composition, if present, will be in the range of from 0.01% to 1% by weight, based on the total weight of the precursor composition.

Other parameters which can be used to control the average size and/or density of randomly distributed craters include (in addition to the amounts and types of surfactants and other components which may optionally be added to the CLCP precursor composition, examples of which are set forth below) the length of the period of time that elapses between the application and the curing of the precursor composition (sometimes referred to herein as "development time", which period of time may, for example, be not shorter than 2 seconds and not longer than 30 seconds), the thickness of the applied layer of the precursor composition, the viscosity of the precursor composition, and the method of applying the precursor composition onto the first or intermediate layer.

In the CLCP layer of the marking according to the present invention the randomly distributed craters preferably have an average size (i.e., average largest dimension as determined by, e.g., use of a suitable microscope, based on the largest dimensions of preferably at least 10, e.g., at least 20 craters in a selected area of the CLCP layer) of at least 1 µm, e.g., at least 2 µm, at least 3 µm, at least 4 µm, at least 5 µm, at least 10 µm, at least 20 µm, at least 30 µm, at least 40 µm, at least 50 µm, at least 80 µm, at least 100 µm, or at least 200 µm. The average size of the craters is preferably not higher than 1000 µm, e.g., not higher than 900 µm, not higher than 800 µm, not higher than 700 µm, not higher than 600 µm, or not higher than 500 µm. Of course, this does not exclude the presence of individual craters which are significantly smaller than 1 µm or significantly larger than 1000 µm. The craters may be visible to the unaided human eye or invisible to the unaided human eye, or a part thereof may be visible and a part thereof may be invisible to the unaided human eye.

The average number of craters per $cm^2$ in at least one area of the CLCP layer preferably is at least 1, e.g., at least 2, at least 3, at least 4, or at least 5, and not higher than 500, e.g., not higher than 300, not higher than 200, not higher than 100, not higher than 50, or not higher than 25.

The CLCP precursor composition for use in the present invention can be applied to the surface of the first (or optional intermediate) layer in an either uncured or partially or completely cured state by any suitable method such as, for example, by spray coating, knife coating, roller coating, screen coating, curtain coating, gravure printing, flexography, offset printing, dry offset printing, letterpress printing, screen-printing, pad printing, and ink-jet printing (for example, continuous ink-jet printing, drop-on-demand ink-jet printing, or valve-jet printing). As set forth above, the method of applying the precursor composition onto a first layer is one of the parameters that may be used to control the mean diameter and/or the density of the randomly distributed craters present in the second (CLCP) layer.

In preferred embodiments, flexography printing or ink-jet printing techniques can be used for applying the CLCP precursor composition. The industrial ink-jet printers, commonly used for numbering, coding and marking applications on conditioning lines and printing presses, are particularly suitable. Preferred ink-jet printers include single nozzle continuous ink-jet printers (also called raster or multi-level deflected printers) and drop-on-demand ink-jet printers, in particular valve-jet printers. The thickness of the applied precursor composition, after curing, according to the above described application techniques, will usually be at least 1 µm, e.g., at least 3 µm, or at least 4 µm, and will usually be not more than 20 µm, e.g., not more than 15 µm, not more than 12 µm, not more than 10 µm, or not more than about 5 µm. The same thickness ranges are also preferred for the first layer or the layer which comprises both the at least one luminescent substance and the particles comprising a CLCP material of the marking of the present invention.

The CLCP precursor composition will usually comprise a solvent to adjust its viscosity to a value which is suitable for the employed application (e.g., printing) technique. For example, typical viscosity values for ink-jet printing inks are in the range of from about 4 to about 30 mPa·s at 25° C. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene and mixtures of two or more thereof. As set forth above, the viscosity of the CLCP precursor composition also is one of the parameters which can be used to control the density and/or mean diameter of the randomly distributed craters in the CLCP layer.

If the CLCP precursor composition for use in the present invention (or any of the resins or varnishes used for providing any other layers of the marking of the present invention) is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If the precursor composition is to be cured by a method which is different from irradiation with UV light such as, e.g., by means of high-energy particles (e.g., electron beams), X-rays, gamma-rays, etc. the use of a photoinitiator can, of course, be dispensed with.

The CLCP precursor composition for use in the present invention may also comprise a variety of other optional components which are suitable and/or desirable for achieving a particular desired property of the composition and in general, may comprise any components/substances which do not adversely affect a required property of the precursor composition to any significant extent. As set forth above, these optional components and in particular, the types and concentrations thereof can also affect the density and/or mean diameter of the craters in the CLCP layer or pattern. Non-limiting examples of such optional components are surfactants, resins, silane compounds, sensitizers for the photoinitators (if present), etc. For example, the composition may comprise one or more silane compounds which show a non-negligible solubility in the composition. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy)silane, 3-methacrylo xypropyltrimethoxysilane, octyltri-ethoxysilane, and 3-glycidyloxypropyl triethoxysilane from the Dynasylan® family supplied by Evonik.

Following the application of the precursor composition onto the first layer (or the optional intermediate layer) the precursor composition is brought to a chiral liquid crystal state. To that end the precursor composition will usually be heated, whereby the solvent contained in the composition, if present, is evaporated and the promotion of the chiral liquid crystal state takes place. The temperature used to evaporate the solvent and to promote the formation of the liquid crystal state depends on the components of the precursor composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp. The required heating time depends on several factors such as, e.g., the components of the precursor composition, the type of heating device and the intensity of the heating (energy output of the heating device). In many cases a heating time of from 1 second to 30 seconds such as, e.g., not more than 20 seconds, not more than 10 seconds, or not more than 5 seconds will be sufficient. Once the chiral liquid crystal state has been reached the composition is cured, for example by exposing it to UV radiation (provided a photoinitiator is present in the composition).

In a still further embodiment of the CLCP layer of the marking according to the present invention, the optical (e.g., reflection wavelength) properties of the layer or pattern may have been modified in one or more areas thereof. Examples of methods by which this modification may be accomplished are disclosed in, e.g., WO 2011/069689, WO 2011/069690, WO 2011/069691 and WO 2011/069692, mentioned above, as well as in WO 2012/076533 and WO 2012/076534.

Some of the methods which can be used to modify the optical properties of a CLCP layer of the marking according to the present invention will be described in the following.

For example, after the chiral liquid crystal precursor composition has been applied onto at least a part of the surface of the first layer (or an optional intermediate layer) and has been heated to bring it to a chiral liquid crystal state, there may be applied onto the composition in one or more areas thereof at least one modifying composition which modifies the chiral liquid crystal state locally in the one or more areas (optionally upon heating, depending on the type of modifying composition).

More specifically, following the application of the precursor composition and the formation of a chiral liquid crystal state, a (at least one) modifying composition may be applied onto one or more areas of the applied composition in the chiral liquid crystal state. The modifying composition is capable of changing the chiral liquid crystal state (optionally upon heating, depending on the type of modifying composition). The modifying composition may be applied while the CLCP precursor composition is still in a heated state (e.g., immediately following the completion of the heating operation) or may be applied after the chiral liquid crystal precursor composition has cooled down to at least some extent (e.g., is at substantially room temperature).

Depending on its nature, the modifying composition will usually modify the chiral liquid crystal state from a (predominantly or substantially) anisotropic state which is characterized by specific optical (e.g., color-shifting) properties to:

(i) a (predominantly or substantially) isotropic liquid crystal state where the color shifting properties of the liquid crystal state are substantially absent and/or no longer detectable with the unaided human eye, or (ii) a modified chiral liquid crystal state with at least one optical property that is different from a corresponding optical property of the initial chiral liquid crystal state.

The modifying composition may, for example, be or comprise a modifying agent. The modifying agent will usually comprise one or more aprotic organic compounds which are liquid at room temperature and preferably have a relatively high dipole moment and a relatively high dielectric constant. Non-limiting examples thereof include ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted (e.g., alkyl-substituted) nitrobenzene such as, e.g., dimethyl ketone, methyl ethyl ketone, cyclohexanone, ethyl acetate, dimethyl formamide, dimethyl sulfoxide, nitrobenzene, nitrotoluene, and mixtures of two or more thereof. Preferred compounds for use in the modifying agent include acetone, methyl ethyl ketone and ethyl acetate.

A modifying agent for use in modifying the CLCP layer or pattern of the present invention may further comprise one or more resins to adjust its viscosity. Of course, the resin(s) must be compatible with the application (e.g., printing) technique that is to be employed. Non-limiting examples of resins which may be suitable, depending on the particular circumstances, include polyesters resins such as, e.g., DYNAPOL® L 1203, L 205, L 206, L 208, L 210, L 411, L 651, L658, L 850, L 912, L 952, LH 530, LH 538, LH 727, LH 744, LH 773, LH 775, LH 818, LH 820, LH 822, LH 912, LH 952, LH 530, LH 538, LH 727, LH 744, LH 773, LH 775, LH 818, LH 820, LH 822, LH 823, LH 826, LH 828, LH 830, LH 831, LH 832, LH 833, LH 838, LH898, LH 908, LS436, LS615, P1500, S1218, S1227, S1247, S1249, S1252, S1272, S1401, S1402, S1426, S1450, S1510, S1606, S1611, S243, S320, S341, S361, S394, and S EP1408 from Evonik. Other suitable resins known to those of skill in the art may be used as well. In a preferred embodiment the one or more resins are selected from DYNAPOL® L 1203, L 205, L 206, L 208, L 210, L 411, L 651, L658, L 850, L 912, L 952, LH 530, LH 538, LH 727, LH 744 from Evonik. A typical concentration range for the one or more resins is from 3% to 15% by weight, based on the total weight of the modifying agent.

When the modifying agent comprises a solvent or a solvent mixture, after the evaporation of the solvent the initial chiral liquid crystal state will locally (in one or more area(s)) switch from a (predominantly or substantially) anisotropic state to a (predominantly or substantially) isotropic state.

In another embodiment the modifying composition may be or comprise a second CLCP precursor composition. The second precursor composition which is applied in one or more areas on the first precursor composition in the initial chiral liquid crystal state may be the same as or different from the first precursor composition. Further, everything that is set forth above with respect to the first precursor composition (e.g., components, application methods, etc.) applies equally and without exception also to the second precursor composition.

If the second precursor composition is different from the first precursor composition the one or more differences may relate to, e.g., one or more of the compounds A and B that are present in these compositions and/or to the concentrations of one or more of these compounds. For example, a or the only difference between these compositions may be that one or more (or all) of the chiral dopant compounds B are present in the second composition in a concentration/concentrations that is/are different from the corresponding concentration/concentrations in the first composition. Further, a or the only difference between the first and second compositions may be that the one or more chiral dopant compounds B in the first composition are of formula (I) above and/or related formulae and at least one of the one or more chiral dopant compounds B in the second composition is different from formula (I) and/or related formulae. For example, at least one of the one or more chiral dopant compounds B in the second composition may be an isosorbide or isomannide derivative as described in, e.g., EP-B-0 847 432, GB-A-2 330 139, and U.S. Pat. No. 6,589,445.

After the application (e.g. deposition) of the second precursor composition to one or more areas of the first precursor composition in the initial chiral liquid crystal state having initial optical properties, the second precursor composition is brought to a second chiral liquid crystal state having different optical properties. To that end at least a part of the one or more areas onto which the second precursor composition has been applied is heated, the solvent contained in the composition, if present, is evaporated and the promotion of the desired second chiral liquid crystal state takes place. The temperature used to evaporate the solvent and to promote the formation of the second liquid crystal state depends on the components of the second precursor composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp.

In yet another embodiment, the modifying composition for use in the present invention may be or comprise a chiral dopant composition. The chiral dopant composition preferably comprises one or more (e.g., one, two, three or four) chiral dopant compounds C of formula (I) set forth above and/or related formulae. In a more preferred embodiment the chiral dopant composition comprises at least one chiral dopant compound C and at least one other chiral dopant D which is different from a compound of formula (I) and related formulae. The at least one chiral dopant compound D may be selected, for example, from the derivatives of isosorbides and isomannides which are disclosed in, e.g., EP-B-0 847 432, GB-A-2 330 139, and U.S. Pat. No. 6,589,445.

As chiral dopant compounds C which are preferably present in the chiral dopant composition the chiral dopant compounds B set forth above may, for example, be used. Accordingly, everything that is set forth above with respect to compounds B applies equally and without exception also to compounds C. Also, it is to be appreciated that a (or the only) chiral dopant compound C that is present in the chiral dopant composition may be identical to a (or the only) chiral dopant compound B that is present in the chiral liquid crystal precursor composition.

The chiral dopant composition will usually comprise the one or more chiral dopant compounds in a total concentration of from 0.1% to 30% by weight, e.g., from 0.1% to 25%, or from 0.1% to 20% by weight, based on the total weight of the composition. Often, the total concentration will be from 3% to 10% by weight, e.g., from 5% to 8% by weight, based on the total weight of the chiral dopant composition.

The chiral dopant composition will usually comprise a solvent to adjust its viscosity to a value which is suitable for the employed application (e.g., printing) technique. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene and mixtures of two or more thereof.

After the application of the chiral dopant composition to one or more areas of the CLCP precursor composition in the initial chiral liquid crystal state, the one or more areas are brought to a modified chiral liquid crystal state having modified optical properties. To that end the one or more areas onto which the chiral dopant composition has been applied are heated, the solvent contained in the composition, if present, is evaporated and the promotion of the desired modified chiral liquid crystal state takes place. The temperature used to evaporate the solvent and to promote the formation of the modified liquid crystal state depends on, e.g., the components of chiral dopant composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp.

The application of the modifying composition is performed onto one or more areas of the precursor composition in the initial chiral liquid crystal state preferably with a printing technique and in particular, a technique selected from continuous ink-jet printing, drop-on-demand ink-jet printing, valve-jet printing and spray coating. In a preferred embodiment ink-jet techniques are used for applying the modifying composition. The industrial ink-jet printers, commonly used for numbering and coding and marking applications on conditioning lines and printing presses, are particularly suitable. Preferred ink-jet printers are single nozzle continuous ink-jet printers (also called raster or multi level deflected printers) and drop-on-demand ink-jet printers, in particular valve-jet printers.

It is, of course, possible to use more than one modifying composition and to apply them simultaneously and/or successively onto the applied (first) precursor composition (e.g., in different areas of the applied first precursor composition).

The CLCP layer having randomly distributed craters therein is finally obtained by curing and/or polymerizing the precursor composition in the initial chiral liquid crystal state that has been locally modified (in one or more areas) by the application of the modifying composition. The fixing or hardening is preferably performed by irradiation with UV-light, which induces polymerization of the polymerizable groups present in the precursor composition (and optionally in the modifying composition).

Yet another possible method of modifying the optical properties of the CLCP layer having randomly distributed craters therein of the marking of the present invention in one or more areas thereof (which method can be used alone or in combination with one or more of the methods of modifying the optical properties of a CLCP layer set forth above) involves the use of a salt in the precursor composition, in combination with a layer of a modifying resin that is in contact with the applied uncured precursor composition in the chiral liquid crystal state (e.g., in the form of the first layer or in the form of an intermediate layer between the first layer and the layer of the applied precursor composition).

More specifically, the CLCP precursor composition may comprise at least one salt that changes (usually in a concentration-dependent manner) the position of a selective reflection band ($\lambda_{max}$) and thus, the reflection wavelength range exhibited by the composition (in a chiral liquid crystal state) compared to the position of the selective reflection band exhibited by an (otherwise identical) composition that does not contain the at least one salt. Further, the modifying resin in contact with the uncured CLCP layer changes the position of the selective reflection band exhibited by the cured chiral liquid crystal precursor composition comprising the at least one salt (when in a chiral liquid crystal state) in the one or more areas. The term "modifying resin" as used herein includes cured resins as set forth below, and also includes aqueous resins such as, e.g., polyamide resins (for example, CAS No 175893-71-7, CAS No 303013-12-9, CAS No 393802-62-5, CAS No 122380-38-5, CAS No 9003-39-8), alkyd resins (e.g. of the polyester type), and polyacrylates.

The at least one salt that changes the position of the selective reflection band exhibited by the CLCP layer may be selected from metal salts and (preferably quaternary) ammonium salts.

For example, the at least one salt may comprise at least one salt of a metal such an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate, and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

Further, at least one of the one or more polymerizable monomers used for providing a modifying resin for use in the present invention may comprise at least two unsaturated carbon-carbon bonds and/or at least one of the one or more polymerizable monomers may comprise at least one heteroatom, preferably selected from O, N and S and in particular, O and/or N. For example, at least one of the one or more polymerizable monomers used for providing the modifying resin may comprise one or more groups of formula $H_2C=CH—C(O)—$ or $H_2C=C(CH_3)—C(O)—$. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates.

In another embodiment, the modifying resin for changing the position of the selective reflection band exhibited by the salt-containing cured CLCP layer of the marking of the present invention may comprise a radiation-cured resin, for example, a UV-cured resin.

In this regard, it is to be appreciated that the salt/modifying resin embodiment set forth above may be used not only for changing the color shift (reflection) properties of the CLCP layer but also for modifying the average density and/or size of the craters randomly distributed therein, thereby adding to the complexity (and security) of a marking comprising the CLCP layer.

In another embodiment of the CLCP layer having randomly distributed craters therein and/or the first (and/or the optional intermediate) layer of the marking according to the present invention, the layer may comprise one or more materials having detectable properties that are different from a property of the CLCP itself in order to further strengthen the security provided by the layer or pattern (e.g., in the form of a marking) For example, the one or more materials may include one or more of flakes, fibers, inorganic compounds, organic compounds, dyes, pigments, absorber materials absorbing electromagnetic radiation in the UV and/or visible and/or IR range, colored materials, photochromic materials, thermochromic materials, magnetic materials, and materials having one or more detectable particle size distributions (e.g., having a monomodal or a polymodal size distribution). The one or more materials may be present in the composition for making a layer in individual concentrations of, e.g., from 0.001% to 1% by weight, based on a total weight of the precursor composition or a total weight of the first or intermediate layer, respectiveley.

Non-limiting examples of IR absorber materials for use in the present invention include those disclosed in WO2007/060133. Non-limiting examples of specific materials include copper(II) fluoride ($CuF_2$), copper hydroxyfluoride (CuFOH), copper hydroxide ($Cu(OH)_2$), copper phosphate hydrate ($Cu_3(PO_4)_2*2H_2O$), anhydrous copper phosphate ($Cu_3(PO_4)_2$), basic copper(II) phosphates (e.g. $Cu_2PO_4$(OH), "Libethenite" whose formula is sometimes written as $Cu_3(PO_4)\ 2*Cu(OH)_2$; $Cu_3(PO_4)(OH)_3$, "Cornetite", $Cu_5(PO_4)_3(OH)_4$, "Pseudomalachite", $CuAl_6(PO_4)_4(OH)_8 \cdot 5H_2O$ "Turquoise", etc.), copper (II) pyrophosphate ($Cu_2(P_2O_7)*3H_2O$), anhydrous copper(II) pyrophosphate ($Cu_2(P_2O_7)$), copper(II) metaphosphate ($Cu(PO_3)_2$, more correctly written as $Cu_3(P_3O_9)_2$), iron(II) fluoride ($FeF_2*4H_2O$), anhydrous iron(II) fluoride ($FeF_2$), iron(II) phosphate ($Fe_3(PO_4)_2*8H_2O$, "Vivianite"), lithium iron(II) phosphate ($LiFePO_4$, "Triphylite"), sodium iron(II) phosphate ($NaFePO_4$, "Maricite"), iron(II) silicates ($Fe_2SiO_4$, "Fayalite"; $FexMg_2xSiO_4$, "Olivine"), iron(II) carbonate ($FeCO_3$, "Ankerite", "Siderite"); nickel(II) phosphate ($Ni_3(PO_4)_2*8H_2O$), and titanium(III) metaphosphate ($Ti(P_3O_9)$). Moreover, a crystalline IR absorber may also be a mixed ionic compound, i.e., where two or more cations are participating in the crystal structure, as e.g. in $Ca_2Fe(PO_4)_2*4H_2O$, "Anapaite". Similarly, two or more anions can participate in the structure as in the mentioned basic copper phosphates, where $OH^-$ is the second anion, or even both together, as in magnesium iron phosphate fluoride, $MgFe(PO_4)F$, "Wagnerite". Additional non-limiting examples of materials for use in the present invention are disclosed in WO 2008/128714 A1.

The one or more magnetic materials (including soft magnetic materials and hard magnetic materials) for (optional) use in one or more of the layers of the marking of the present invention may comprise at least one material selected from ferromagnetic materials, ferrimagnetic materials, paramagnetic materials, and diamagnetic materials. For example, the one or more magnetic materials may comprise at least one material selected from metals and metal alloys comprising at least one of iron, cobalt, nickel, and gadolinium. Further, the magnetic material may comprise, without limitation, an alloy of iron, cobalt, aluminum, and nickel (with or without copper, niobium and/or tantalum), such as Alnico, or an alloy of titanium, nickel, cobalt, aluminum, and iron, such as Ticonal; and ceramics. The one or more magnetic materials may also comprise at least one material selected from inorganic oxide compounds such as maghemite and/or hematite, ferrites of formula $MFe_2O_4$ wherein M represents Mg, Mn, Co, Fe, Ni, Cu or Zn, and garnets of formula $A_3B_5O_{12}$ wherein A represents La, Ce, Pr, Nd, Sm, Eu, Gd, Tb, Dy, Ho, Er, Tm, Yb, Lu or Bi and B represents Fe, Al, Ga, Ti, V, Cr, Mn or Co.

The one or more materials may be substantially invisible under light inside the visible spectrum but visible under light outside the visible spectrum, such as UV or IR light. Of course, the material must also be compatible with the liquid crystal polymer.

If one or more materials having detectable properties that are different from a property of the CLCP layer of the marking according to the present invention itself are present in the layer in the form of particles and/or flakes, they may be randomly distributed in the CLCP precursor composition and may thus, be randomly distributed in the final cured CLCP layer. In combination with suitable detection methods for the detectable properties of the one or more materials, this random distribution of particles/flakes can be exploited as an additional means for identifying/authenticating/tracking an article/item that is provided with a marking comprising a CLCP layer according to the present invention (i.e., in addition to the density and/or mean diameter of the randomly distributed craters and the (optionally modified) optical properties of the CLCP layer itself).

In one embodiment of the marking of the present invention the marking comprises a layer that has particles consisting of or comprising a CLCP material randomly distributed therein. The layer may be the second layer on top of the first layer that comprises the at least one luminescent substance (with one or more optional intermediate layers arranged between the first and second layers) or may be a single layer that also comprises the at least one luminescent substance. The randomly distributed particles may have any form or shape but preferably are substantially two-dimensional, i.e., the ratio of their largest dimension to their thickness is at least 10, e.g., at least 20, at least 30, at least 40, at least 50, at least 100, at least 150, at least 200, or at least 300. Preferred substantially two-dimensional particles are flakes. These flakes may consist of a single CLCP material or they may consist of two or more CLCP materials, optionally in combination with one or more non-CLCP materials. Non-limiting examples of corresponding flakes include those which are disclosed in U.S. provisional Application No. 61/616,133, filed Mar. 27, 2012. The multilayer flakes disclosed in this document comprise at least two chiral liquid crystal polymer (CLCP) layers comprising a first CLCP layer, a second CLCP layer which is different from the first CLCP layer and at least one additional layer comprising a material that is not a chiral liquid crystal polymer (such as, e.g., a magnetic material). Of course, more than one type of randomly distributed particles (e.g., flakes) comprising a CLCP material may be present in the marking according to the present invention. Also, the flakes may comprise at least one layer (e.g. exactly one layer) of CLCP material and one or more layers of non-CLCP material. For example, they can be multilayer flakes of the type disclosed in the above provisional application in which one or more layers of non-CLCP material are sandwiched between two layers of the same CLCP material. Examples of materials for the non-CLCP layer(s) include inorganic compounds, organic compounds, dyes, pigments, absorber materials absorbing electromagnetic radiation in the UV and/or visible and/or IR range, colored materials, photochromic materials, thermochromic materials, and magnetic materials.

If at least one intermediate layer (e.g., a UV-cured varnish) is present between the first and second layers of the marking of the present invention (or if a layer is present above and/or below the single layer that comprises both the at least one luminescent substance and the particles comprising a CLCP material) this layer may comprise one or more materials having detectable properties which are different from a property of the CLCP layer or the CLCP particles. The one or more materials may include, for example one or more of non-CLCP flakes, fibers, inorganic compounds, organic compounds, dyes, pigments, absorber materials absorbing electromagnetic radiation in the UV and/or visible and/or IR range, colored materials, photochromic materials, thermochromic materials, magnetic materials, and materials having one or more detectable particle size distributions (e.g., a monomodal or a polymodal size distribution). Examples of corresponding materials which are suitable for this purpose include the materials which are set forth above as examples of the one or more materials which may be present in the first or second layers of the marking according to the present invention.

The marking of the present invention may be used for identifying, authenticating and/or tracking an article or item having the marking thereon.

Merely by way of example, a method of marking a substrate, article or item may comprise providing the substrate, article or item with a marking of the present invention, reading data obtained from, and being representative of the marking (in particular, the intensity and/or polarity of the light emitted thereby in different areas thereof upon irradiation with radiation comprising an excitation wavelength of the at least one luminescent material) and recording and storing the read data in a computer database. A method of identifying and/or authenticating and/or tracking the marked substrate, article or item may comprise, for example, reading data obtained from, and being representative of the marking and comparing the read data with the data previously recorded and stored in the computer database. The read data may relate to, for example, one or more optical properties of the CLCP layer or a part thereof and the density, position and/or mean diameter of the randomly distributed craters in the CLCP layer or a part thereof, and any combination of these properties. The read data may additionally relate to the optical (e.g., absorption, reflectance, fluorescence, luminescence), magnetic and/or other properties (e.g., positional and/or size distribution properties in the case of particulate matter) of materials which may optionally be present in the CLCP layer or any other layer or part thereof that may be present in the marking of the present invention.

A reading device suitable for use in the above methods may comprise, for example, at least illumination elements and optical detection elements. Additionally, it may comprise elements for magnetic detection. A non-limiting example of a device which may be suitable as reading device is a mobile phone.

The marking of the present invention and the favorable effects obtainable thereby will in the following be illustrated by reference to the drawings.

FIG. 1 shows schematically a substrate having a marking according to the present invention thereon. The first layer of the marking (on the surface of the substrate) contains a luminescent substance and the second layer of the marking (present on parts of the first layer) is a CLCP layer having randomly distributed craters therein (as shown in the photograph at the right side of FIG. 1). If a portion of the first layer of the marking that is not covered by the second layer (either not covered at all or not covered due to the presence of a crater) is irradiated with radiation that comprises an excitation wavelength of the luminescent substance (in the drawing the absorption maximum of the luminescent substance is at 619 nm) the luminescent substance will emit radiation of a longer wavelength (in the drawing the maximum intensity of the emitted luminescence is at a wavelength of 717 nm). Further, if the luminescence passes through a portion of the CLCP layer and at least a part of the luminescence wavelength range overlaps at least a part of the wavelength range in which the CLCP material reflects radiation the intensity of the radiation emitted by the luminescent substance will be significantly decreased because the CLCP material is transparent only for circular polarized light that is opposite to the direction of the rotation of the CLCP material, whereas circular polarized light of the same direction of rotation as the CLCP material is reflected back in the direction of the first layer. In other words, in this case luminescence radiation that escapes through a crater in the CLCP layer has a significantly higher intensity than the (remaining, at least partially polarized) radiation that is allowed to pass through the (solid) CLCP layer, whereby there is a contrast between the layer and the crater in terms of intensity of luminescence. This difference is particularly high if only the polarized part of the radiation (right-handed or left-handed) that is reflected by the CLCP material is detected. A further advantage of the marking of the present invention is that the radiation that is to be detected is independent of the angle of observation (in contrast to radiation reflected by a CLCP material that is irradiated from the side of the CLCP layer). In particular, the radiation to be detected is invariably the radiation emitted by the luminescent substance, whose wavelength does not change, let alone change with the angle of observation.

Figure 2:
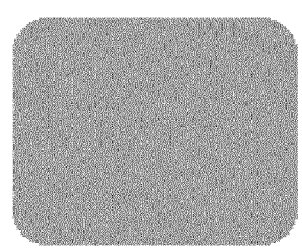
FIG. 2 schematically shows a top view of the substrate with a marking shown in FIG. 1.
Figure 2:
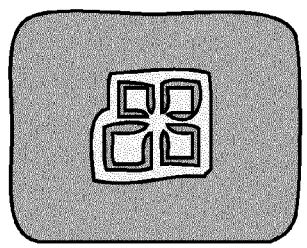
Figure 2:
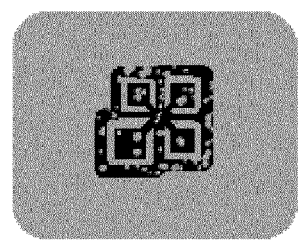
Figure 3:
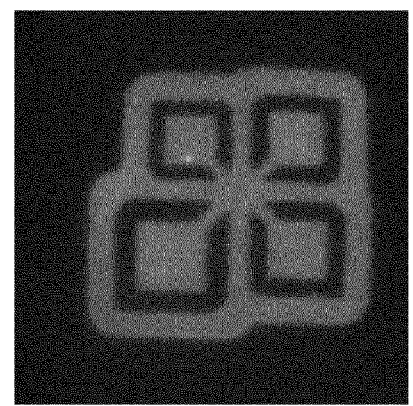
FIG. 3 shows recorded images obtained with a marking as schematically shown in FIGS. 1 and 2.
Figure 3:
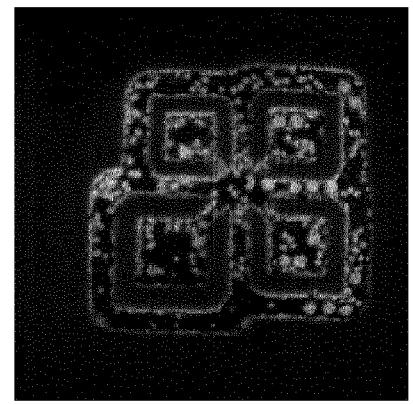
Figure 3:
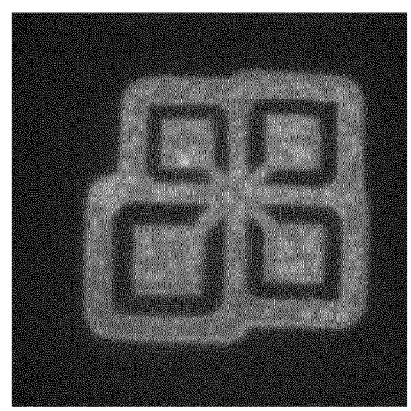

FIG. 2 shows a top view of substrate plus marking schematically shown in FIG. 1. The left side shows a discontinuous layer (pattern) on the substrate which comprises the luminescent substance. On the right side this pattern is covered by a CLCP layer having randomly distributed craters therein. FIG. 3 shows on the left side an image of the radiation reflected by the irradiated marking taken with a filter for left-hand polarized radiation and in the middle an image taken with a filter for right-hand polarized radiation. As can be seen, there is hardly any difference in the intensity of the emitted luminescence between the CLCP layer and the craters when the filter for radiation of right-handed polarization is employed, in contrast to the image taken with the filter of opposite polarization. The contrast between the CLCP layer and the craters can even be increased by subtracting the image obtained with the right-handed filter from the image obtained with the left-handed filter.

Figure 4:
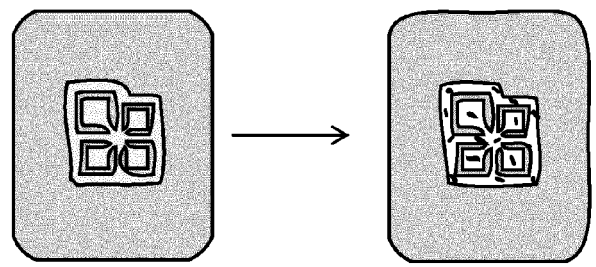
FIG. 4 schematically shows a top view of a substrate carrying thereon a marking according to the present invention with a layer comprising randomly distributed randomly distributed particles comprising a CLCP material on top of a layer comprising a luminescent substance.
Figure 5:
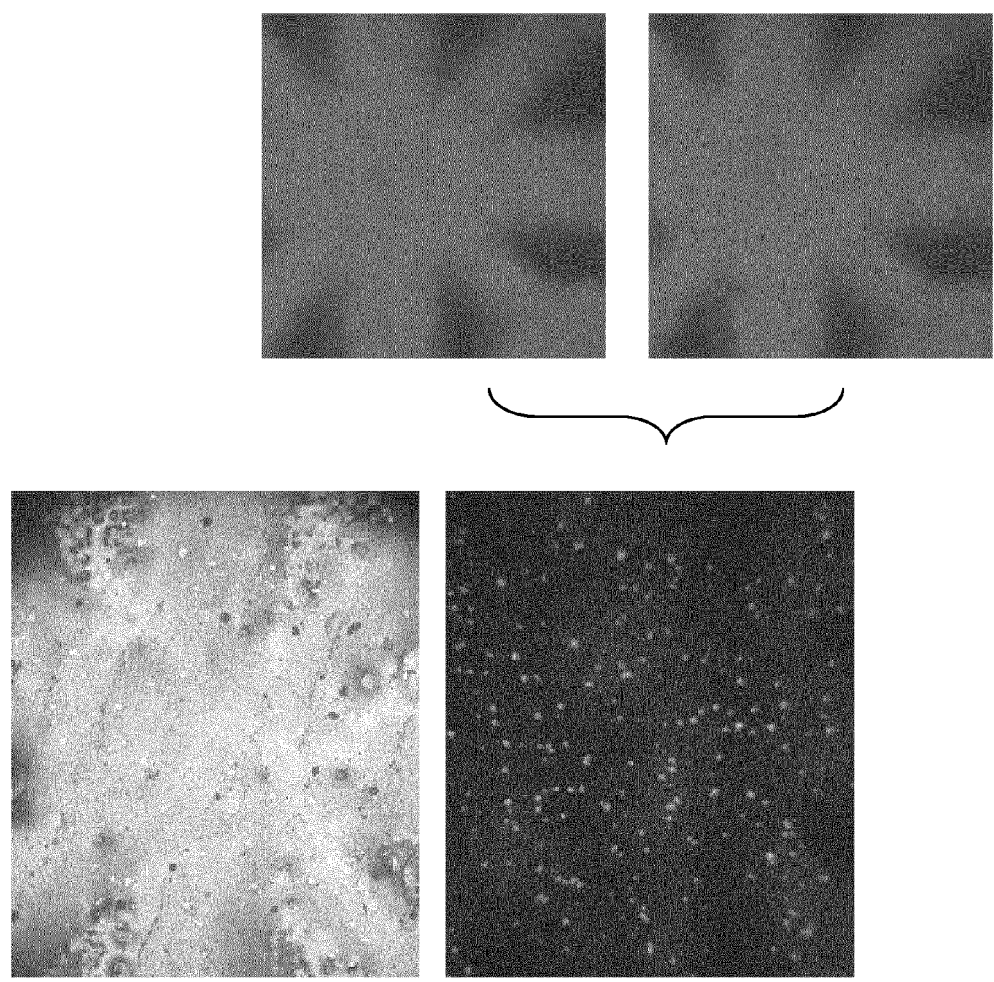
FIG. 5 shows recorded images obtained with a marking as schematically shown in FIG. 4.

FIG. 4 is similar to FIG. 2 in that it schematically shows on the left side a substrate with a discontinuous layer (pattern) comprising a luminescent substance. However, in the drawing on the right side the luminescent layer is not covered by a CLCP layer with craters, but with a layer that has randomly distributed CLCP flakes dispersed therein. FIG. 5 is similar to FIG. 3 in that it shows luminescence images taken with a filter for right-hand polarized radiation and filter for left-hand polarized radiation and the image resulting from a subtraction of these images. As can be seen, in contrast to the individual images, the "subtracted image" clearly shows (all of) the CLCP flakes. Not all of these flakes would have been visible by irradiating the marking from above and taking an image of the reflected radiation because some of the flakes would have been oriented parallel or almost parallel to the direction of radiation and thus, unable to reflect any radiation. In other words, the visibility of a flake does not depend on its orientation relative to the direction of the irradiation because the radiation that impinges on a particular flake originates from the luminescent layer beneath the flakes and from all directions.

The examples below art to further illustrate the present invention without limiting it in any way.

EXAMPLE 1

Using silkscreen printing, a layer of a first transparent varnish (see Composition 1 below) comprising a luminescent substance is applied onto a white paper substrate. The thickness of the layer is about 15 µm. The varnish, printed in the shape of a logo, is dried (polymerized) using an Aktiprint mini 18-2 UV dryer available from Technigraf.

| Composition 1 | % by weight |
| --- | --- |
| Genomer 3414[1] | 10 |
| Photocryl DP143[2] | 45 |
| Ebecryl 83[3] | 25.4 |
| HDDA[4] | 6 |
| ACMO[5] | 6 |
| Esacure kip 160[6] | 5 |
| Aerosil R 972[7] | 2 |
| Airex 920[8] | 0.1 |
| Luminescent substance 1 | 0.5 |
| Total | 100 |

Figure 6A:
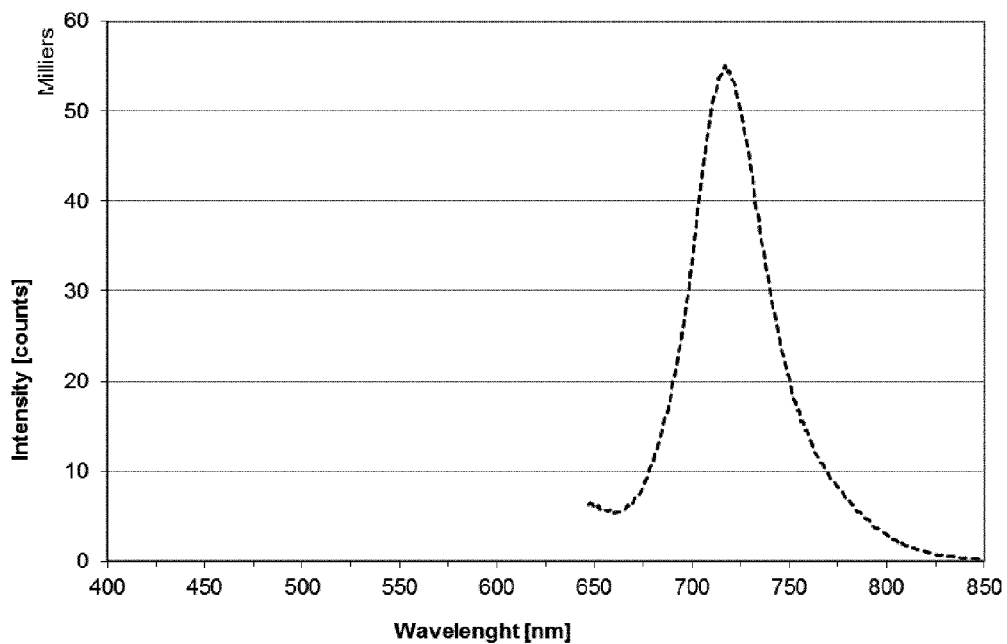
FIG. 6a shows the emission spectrum and FIG. 6b shows the emission spectrum plus the reflection spectrum of the substances employed in Example 1 below.
Figure 6B:
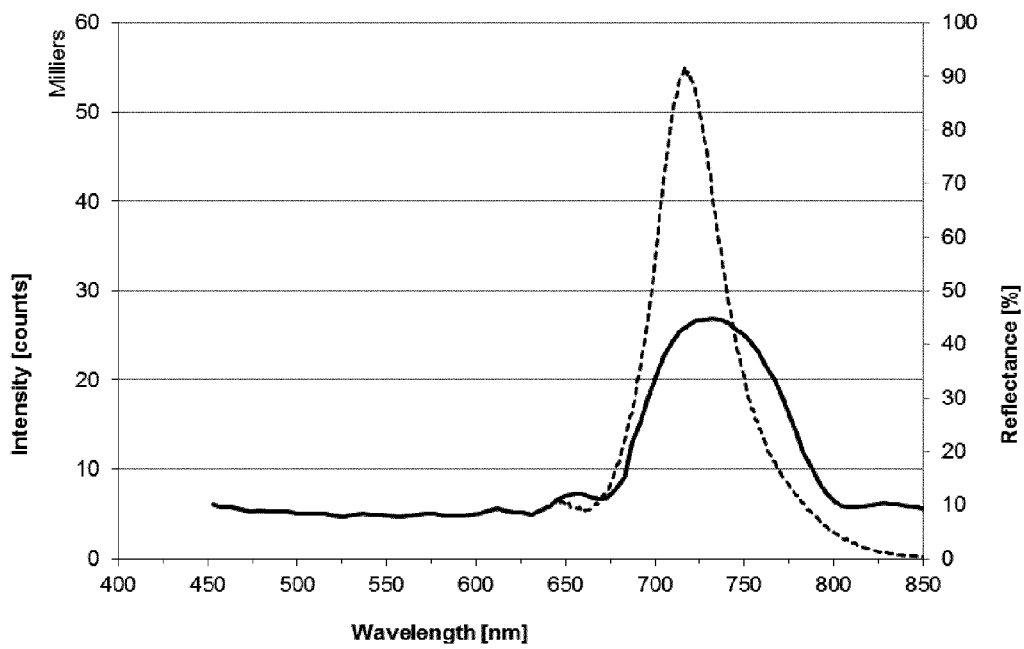

[1] modified polyether acrylate available from Rahn
[2] amine-modified polyester acrylate having a viscosity of 1,500 mPa · s available from Miwon Specialty Chemical Co., Ltd.
[3] low viscosity amine-modified multifunctional acrylated polyether oligomer available form Cytec
[4] hexanediol diacrylate
[5] acryloyl morpholine available from Rahn
[6] difunctional alpha-hydroxyketone available from Lamberti SpA
[7] fumed silica aftertreated with dimethyldichlorosilane available from Evonik Industries
[8] deaerator for radiation curing systems available from Tego Chemie Service Luminescent substance 1 (product of SICPA) is an organic compound that emits radiation having a peak wavelength of about 717 nm when excited with radiation having a wavelength of 617 nm. The emission spectrum of luminescent substance 1 is shown in FIG. 6a.

A layer of CLCP precursor composition (see Composition 2 below) is applied on top of the layer containing luminescent substance 1 using a laboratory k-bar coater available from Erichsen. The thickness of the layer is 4 µm. After deposition of the CLCP precursor composition the sample is rapidly placed under a hot air flow generated by a Hotwind S 100V hot air blower (available from Leister) placed at about 30 cm above the sample. The sample is kept under the hot air flow for about 26 seconds. The hot air blower is set to expose the surface of the CLCP precursor layer to air of about 70° C. During the 26 seconds the solvent evaporates, the chiral liquid crystal state develops and craters appear all over the surface of the CLCP layer. The liquid crystal composition is then dried using the Aktiprint mini 18-2 UV dryer.

| Composition 2 | % by weight |
|---|---|
| Cyclohexanone | 47.3 |
| Nematic compound I | 23.3 |
| Nematic compound II | 23.4 |
| Cholesteric compound | 4.4 |
| Irgacure 907[9] | 1.2 |
| SR586[10] | 0.4 |
| Total | 100 |

[9]photoinitiator (2-methyl-1[4-(methylthio)phenyl]-2-morpholinopropan-1-one) available from Ciba Specialty Chemicals
[10]acrylic ester available from Sartomer USA, LLC Following drying the resultant CLCP layer exhibits a reflection band with a peak at around 737 nm. This reflection band partially overlaps the emission band of luminescent substance 1 (see FIG. 6b). The radiation reflected by the CLCP layer is left-polarized.

When analyzing the emission of luminescent substance 1 it is possible to obtain two different images, depending on whether the right or the left polarized part of the luminescence emitted by the sample is detected. In particular the left part of FIG. 3 shows the emitted luminescence filtered with a filter for right polarized light, whereas the middle part of FIG. 3 shows the emitted luminescence filtered with a filter for left polarized light. The subtraction of the two images affords a highly contrasted image of the randomly distributed craters in the CLCP layer (see right part of FIG. 3, which shows the image after subtraction of the image of right polarization from the image of left polarization).

EXAMPLE 2

Using silkscreen printing, a layer of a first transparent varnish (see Composition 3 below) comprising a luminescent substance is applied onto a white paper substrate. The thickness of the layer is about 15 µm. The varnish, printed in the shape of a logo, is dried (polymerized) using an Aktiprint mini 18-2 UV dryer available from Technigraf.

| Composition 3 | % by weight |
|---|---|
| Genomer 3414 | 10 |
| Photocryl DP143 | 44.5 |
| Ebecryl 83 | 26.6 |
| HDDA | 6.4 |
| ACMO | 6.4 |
| Esacure kip 160 | 5 |
| Aerosil R 972 | 0.5 |
| Airex 920 | 0.1 |
| Luminescent substance 2 | 0.5 |
| Total | 100 |

Figure 7:
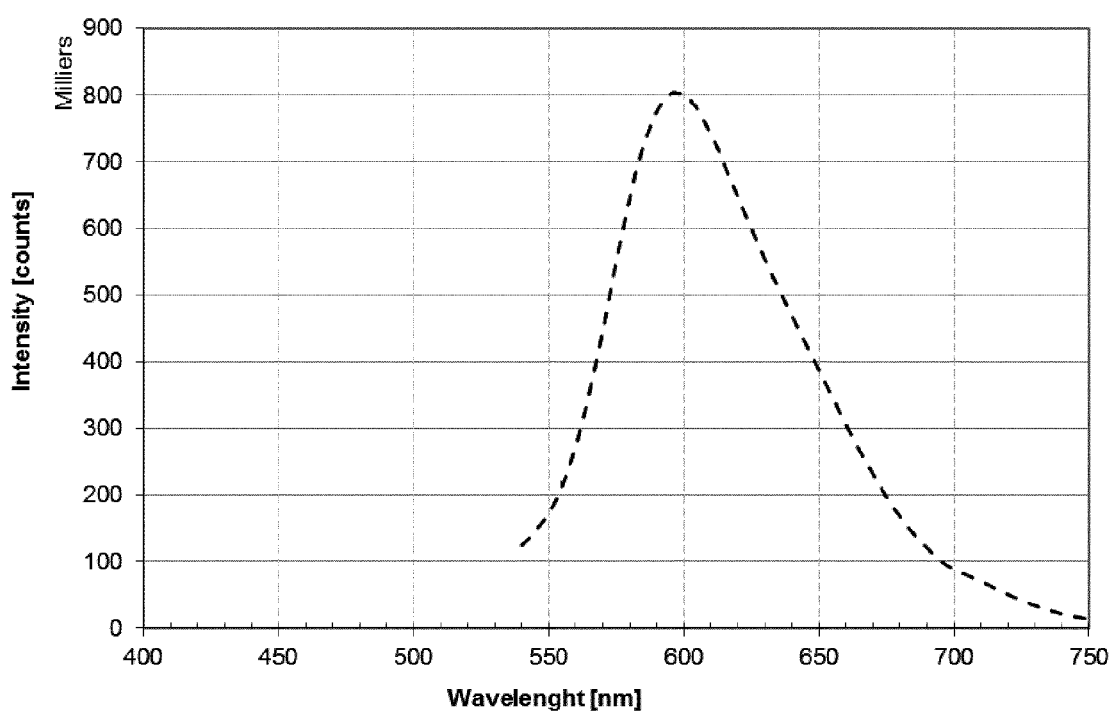
FIG. 7 shows the emission spectrum of the luminescent substance employed in Example 2 below.

Luminescent substance 2 (product of SICPA) is an organic compound that emits radiation having a peak wavelength of about 597 nm when excited with radiation having a wavelength of 510 nm. The emission spectrum of luminescent substance 2 is shown in FIG. 7.

A layer (thickness 15 µm) of a second varnish comprising a random distribution of CLCP flakes (see Composition 4 below) is then screen-printed in the shape of a logo on top of the layer containing luminescent substance 2. The second varnish is dried (polymerized) using an Aktiprint mini 18-2 UV dryer available from Technigraf.

| Composition 4 | % by weight) |
|---|---|
| Genomer 3414 | 9.9 |
| Photocryl DP143 | 44.2 |
| Ebecryl 83 | 26.2 |
| HDDA | 6.4 |
| ACMO | 6.3 |
| Esacure kip 160 | 4.9 |
| Aerosil R 972 | 1 |
| Airex 920 | 0.1 |
| CLCP flakes Red | 1 |
| Total | 100 |

The CLCP flakes in Composition 4 are chosen in such a way that their reflection band partially overlaps the emission band of luminescent substance 2. In this example the reflection band of the CLCP flakes is centered at around 630 nm and thus partially overlaps the emission band of luminescent substance 2. The radiation reflected by the CLCP flakes is right polarized.

When analyzing the radiation emitted by luminescent substance 2 it is possible to obtain two different images, depending on whether the right or the left polarized part of the emitted radiation is detected.

The upper right side of FIG. 5 shows the right-polarized part of the detected luminescence, featuring several dark dots which allow to locate the position of the flakes. (The upper left side of FIG. 5 shows the left-polarized part of the luminescence.)

The subtraction of the upper two images shown in FIG. 5 affords a highly contrasted image of the random distribution of the flakes where virtually every single flake can be observed (see lower right part of FIG. 5). This method of analysis provides more information because each single flake is detected. When comparing two images of the same area of the marking, one image featuring the reflection of the flakes (lower left part of FIG. 5) and another image analyzing the luminescence by subtraction of two images (lower right part of FIG. 5), the first image shows about 124 flakes while the second image shows about 223 flakes.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A marking on a substrate for identifying and/or authenticating an item or good wherein the marking comprises at least one luminescent substance (a) and at least one chiral liquid crystal polymer (CLCP) material (b) having a reflection wavelength range that overlaps at least a part of the luminescence wavelength range of (a), at least a part of (a) being located underneath (b).

2. The marking of claim 1, wherein the marking comprises (i) a first layer comprising (a) and, arranged on top of at least a part of the first layer, (ii) at least a part of (b) in the form of randomly distributed particles comprising (b), wherein said particles are randomly distributed in a matrix of a second layer and said matrix is made of non-CLCP and/or of CLCP material that has a reflection wavelength range that does not overlap at least a part of the luminescence wavelength range of (a) that is overlapped by (b).

3. The marking according to claim 2 further comprising arranged on top of at least a part of the first layer at least a part of (b) in the form of a second layer, wherein the second layer is made of (b) and comprises craters randomly distributed therein.

4. The marking of claim 1, wherein the marking comprises a layer of non-CLCP material and/or of CLCP material that has a reflection wavelength range that does not overlap at least a part of the luminescence wavelength range of (a) that is overlapped by (b), which layer comprises at least a part of (a) dissolved and/or dispersed therein and, randomly distributed in at least a part of the said layer, particles comprising (b).

5. A method of at least one of identifying, authenticating, tracking, and tracing an item or good provided with a marking according to claim 1, wherein the method comprises (I) irradiating the marking with radiation that comprises an excitation wavelength of the at least one luminescent substance (a) and (II) detecting the radiation emitted by the marking.

6. The method of claim 5, wherein (II) comprises detecting the emitted radiation by using a filter for right-handed polarized light and/or a filter for left-handed polarized light.

7. The method of claim 6, wherein the radiation detected with one filter is subtracted from the radiation detected with the other filter.

8. The method of claim 5, further comprising collecting data relating to an image of randomly distributed craters or data relating to an image of randomly distributed particles comprising the CLCP material, and comparing the collected data to stored data.

9. The marking according to claim 1, wherein the marking comprises (i) a first layer comprising (a) and, arranged on top of at least a part of the first layer, (ii) at least a part of (b) in the form of a second layer, wherein the second layer is made of (b) and comprises craters randomly distributed therein.

10. An item or good which comprises on a surface thereof a marking for identifying and/or authenticating said item or good wherein the marking comprises at least one luminescent substance (a) and at least one chiral liquid crystal polymer (CLCP) material (b) having a reflection wavelength range that overlaps at least a part of the luminescence wavelength range of (a), at least a part of (a) being located underneath (b).

11. The item or good according to claim 10, wherein the marking comprises (i) a first layer comprising (a) and, arranged on top of at least a part of the first layer, (ii) at least a part of (b) in the form of randomly distributed particles comprising (b), wherein said particles are randomly distributed in a matrix of a second layer and said matrix is made of non-CLCP and/or of CLCP material that has a reflection wavelength range that does not overlap at least a part of the luminescence wavelength range of (a) that is overlapped by (b).

12. The item or good according to claim 11, wherein the marking further comprises arranged on top of at least a part of the first layer at least a part of (b) in the form of a second layer, wherein the second layer is made of (b) and comprises craters randomly distributed therein.

13. The item or good according to claim 10, wherein the marking comprises (i) a first layer comprising (a) and, arranged on top of at least a part of the first layer, (ii) at least a part of (b) in the form of a second layer, wherein the second layer is made of (b) and comprises craters randomly distributed therein.

14. The item or good according to claim 10, wherein the marking comprises a layer of non-CLCP material and/or of CLCP material that has a reflection wavelength range that does not overlap at least a part of the luminescence wavelength range of (a) that is overlapped by (b), which layer comprises at least a part of (a) dissolved and/or dispersed therein and, randomly distributed in at least a part of the said layer, particles comprising (b).

15. The item or good according to claim 10, wherein said item or good comprising on a surface thereof a marking for identifying and/or authenticating said item or good is selected from the group consisting of a label, packaging, a cartridge, a container or a capsule that contains foodstuffs, nutraceuticals, pharmaceuticals or a beverage, a banknote, a credit card, a stamp, a tax label, a security document, a passport, an identity card, a driver's license, an access card, a transportation ticket, an event ticket, a voucher, an ink-transfer film, a reflective film, an aluminum foil, and a commercial good.

16. A method of marking an item or good, wherein the method comprises providing the item or good with a marking comprising at least one luminescent substance (a) and at least one chiral liquid crystal polymer (CLCP) material (b) having a reflection wavelength range that overlaps at least a part of the luminescence wavelength range of (a), at least a part of (a) being located underneath (b).

17. The method of claim 16, wherein the method comprises (I) applying a curable resin having the at least one luminescent substance (a) dispersed and/or dissolved therein onto at least a part of an outer surface of the item or good to form a first layer and, optionally, at least partially curing the resin, (II) applying on top of at least a part of the first layer a CLCP precursor composition to form a second layer and, optionally, heating the applied precursor composition to promote the chiral liquid crystal state thereof, and (III) curing the precursor composition and, optionally, the not yet or not yet fully cured resin of the first layer, the application of the CLCP precursor composition being effected to result in a random formation of craters in at least a part of the cured second layer.

18. The method of claim 16, wherein the method comprises (I') applying a first curable resin having the at least one luminescent substance (a) dispersed and/or dissolved therein onto at least a part of an outer surface of the item or good to form a first layer and, optionally, at least partially curing the first resin, (II') applying onto at least a part of the first layer a second curable resin having particles comprising the at least one CLCP material (b) randomly distributed therein to form a second layer on top of at least a part of the first layer, and (III') curing the second resin and, optionally, the not yet or not yet fully cured first resin.

19. The method of claim 16, wherein the method comprises (I") applying a curable resin having the at least one luminescent substance (a) dispersed and/or dissolved therein onto at least a part of an outer surface of the item or good to form a layer and, optionally, at least partially curing the resin, (II") randomly distributing on top of at least a part of the layer particles comprising the at least one CLCP material (b) and, optionally, (III") curing the not yet or not yet fully cured resin.

20. The method of claim 16, wherein the method comprises applying a curable resin having the at least one luminescent substance (a) dispersed and/or dissolved therein and further having particles comprising the at least one CLCP material (b) randomly dispersed therein onto at least a part of an outer surface of the item or good to form a layer, and thereafter curing the resin.

21. The method of claim 16, wherein the method comprises applying onto at least a part of a surface of an item or good that comprises the at least one luminescent substance (a) the at least one chiral liquid crystal polymer (CLCP) material (b).

22. The method of claim 21, wherein (b) is applied in the form of at least one of (1) particles comprising (b) as such, (2) a curable resin having particles comprising (b) dispersed therein, (3) a layer of (b) having randomly distributed craters therein.

23. A method of improving the detectability of a crater present in a chiral liquid crystal polymer (CLCP) layer of a marking on an item or good, wherein the method comprises providing underneath at least the portion of the CLCP layer that comprises the crater a luminescent substance having a luminescence wavelength range that at least partially overlaps the reflection wavelength range of the CLCP, causing at least a part of the luminescence radiation from the at least one luminescent substance that passes through the CLCP layer to be polarized and less intense than the luminescence radiation from the at least one luminescent substance that passes through the crater.

24. A method of making the detectability of a substantially two-dimensional particle comprising a chiral liquid crystal polymer (CLCP) material present as such or in a resin layer upon irradiating the particle or layer with a source of radiation independent of the orientation of the particle relative to the source of radiation, wherein the method comprises (i) providing underneath the particle or underneath at least the portion of the resin layer that comprises the particle a luminescent substance having a luminescence wavelength range that at least partially overlaps the reflection wavelength range of the CLCP material or (ii) including the luminescent substance directly in the resin layer comprising the particle, provided that the resin layer itself does not overlap the luminescence wavelength range of the at least one luminescent substance.

* * * * *